United States Patent
Mori et al.

(10) Patent No.: US 10,241,497 B2
(45) Date of Patent: Mar. 26, 2019

(54) ADJUSTMENT APPARATUS, CONTROL PARAMETER ADJUSTMENT METHOD, INFORMATION PROCESSING PROGRAM, AND STORAGE MEDIUM

(71) Applicant: OMRON Corporation, Kyoto-shi, Kyoto (JP)

(72) Inventors: Yasumoto Mori, Joyo (JP); Mamoru Egi, Otsu (JP); Yasutomo Kawanishi, Kusatsu (JP); Yasushi Ono, Kusatsu (JP); Shota Miyaguchi, Nara (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/361,797

(22) Filed: Nov. 28, 2016

(65) Prior Publication Data
US 2017/0176971 A1 Jun. 22, 2017

(30) Foreign Application Priority Data
Dec. 18, 2015 (JP) .................................. 2015-247619

(51) Int. Cl.
*G05B 19/402* (2006.01)
*G05B 13/02* (2006.01)
*G05B 19/416* (2006.01)

(52) U.S. Cl.
CPC ......... *G05B 19/402* (2013.01); *G05B 13/024* (2013.01); *G05B 19/416* (2013.01); *G05B 2219/34013* (2013.01); *G05B 2219/41077* (2013.01); *G05B 2219/41123* (2013.01); *G05B 2219/41163* (2013.01)

(58) Field of Classification Search
CPC ........... G05B 2219/39222; G05B 2219/39336; G05B 2219/39355; G05B 2219/41368
See application file for complete search history.

(56) References Cited

U.S. PATENT DOCUMENTS

| | | | |
|---|---|---|---|
| 6,832,127 B1 | 12/2004 | Hao et al. | |
| 2004/0085035 A1* | 5/2004 | Tazawa | H02P 6/06 318/432 |
| 2008/0309272 A1 | 12/2008 | Yamanaka et al. | |

(Continued)

FOREIGN PATENT DOCUMENTS

| | | |
|---|---|---|
| CN | 101584111 A | 11/2009 |
| CN | 101895252 A | 11/2010 |

(Continued)

OTHER PUBLICATIONS

Yaskawa, "Sigma II Series Servo System User's Manual (Chapter 7—Using the Digital Operator)", Sep. 1, 2009, pp. 275-330, YEA-SIA-S800-32.2K, Retrieved from the Internet: URL:https://www.yaskawa.com/delegate/getAttachment?documentId=YEA-SIA-S800-32.2&cmd=documents&documentName=YEA-SIA-S800-32.2.pdf&web_access=Public [retrieved on Apr. 7, 2017].

(Continued)

*Primary Examiner* — Bickey Dhakal
(74) *Attorney, Agent, or Firm* — Metrolexis Law Group, PLLC

(57) ABSTRACT

Control that is less likely to cause an overshoot is performed when an actual inertia value is yet to be determined. A development support apparatus sets a ratio of a position proportional gain to a velocity proportional gain to a value smaller than a ratio set when a servo driver has determined an actual inertia value of a load machine.

6 Claims, 10 Drawing Sheets

(56) References Cited

U.S. PATENT DOCUMENTS

| | | | |
|---|---|---|---|
| 2010/0052593 A1 | 3/2010 | Kishimoto et al. | |
| 2012/0268054 A1 | 10/2012 | Kishimoto et al. | |
| 2015/0177710 A1* | 6/2015 | Kigaku | G05B 13/02 318/561 |
| 2016/0041533 A1 | 2/2016 | Ueda | |
| 2016/0048116 A1 | 2/2016 | Imada et al. | |
| 2016/0231730 A1* | 8/2016 | Wakana | G05B 19/409 |

FOREIGN PATENT DOCUMENTS

| | | |
|---|---|---|
| CN | 103633916 A | 3/2014 |
| CN | 105122637 A | 12/2015 |
| CN | 105144575 A | 12/2015 |
| JP | 2011-244668 A | 12/2011 |
| KR | 10-2008-0067087 A | 7/2008 |
| WO | 00/17998 A1 | 3/2000 |
| WO | 2006/075554 A1 | 7/2006 |
| WO | 2008/087893 A1 | 7/2008 |
| WO | 2014/167852 A1 | 10/2014 |
| WO | 2014/171191 A1 | 10/2014 |
| WO | 2015/063842 A1 | 5/2015 |

OTHER PUBLICATIONS

Hannifin Parker, "Fundamentals of Servo Motion Control", Nov. 21, 2010, Retrieved from the Internet: URL:http://web.archive.org/web/20101121160230/http://www.compumotor.com/whitepages/ServoFundamentals.pdf [retrieved on Jul. 4, 2017].

"Control Modes of Operation and Tuning Chapter 5", SureServo AC Servo Systems User Manual, Aug. 1, 2011, p. 5-1a to 5-58, 2nd Ed. Rev B, Retrieved from the Internet: URL:https://cdn.automationdirect.com/static/manuals/sureservomanual/ch5.pdf [retrieved on Jul. 3, 2017].

The extended European search report dated Jul. 26, 2017 in the counterpart European patent application.

The Japanese Office Action (JPOA) dated Sep. 4, 2018 in the counterpart Japanese patent application.

The Chinese Office Action (CNOA) dated Nov. 9, 2018 in the counterpart Chinese patent application.

* cited by examiner

ADJUSTMENT APPARATUS, CONTROL PARAMETER ADJUSTMENT METHOD, INFORMATION PROCESSING PROGRAM, AND STORAGE MEDIUM

CROSS-REFERENCES TO RELATED APPLICATIONS

This application claims priority to Japanese Patent Application No. 2015-247619 filed on Dec. 18, 2015, the entire contents of which are incorporated herein by reference.

FIELD

The present invention relates to an adjustment apparatus that adjusts a control parameter for a servomotor.

BACKGROUND

A control system known in the art for controlling a servomotor sets control parameters including a position gain, a velocity gain, and an inertia value, and controls the driving status of the servomotor. For example, Patent Literature 1 below describes a development system for a servo system including a servomotor, a development support apparatus for adjusting the position gain and the velocity gain of the servomotor, and a servo driver for setting an inertia value.

CITATION LIST

Patent Literature

Patent Literature 1: Japanese Unexamined Patent Application Publication No. 2011-244668 (published on Dec. 1, 2011)

SUMMARY

Technical Problem

With the above technique known in the art, the servo driver sets the inertia value independently of the position gain and the velocity gain set by the development support apparatus. When the set inertia value that is yet to be adjusted deviates greatly from the characteristics of, for example, the actual inertia value, the stability of position control performed with this technique can be lower. This may cause a large overshoot during adjustment of the control parameters. Changing the set inertia value may cause a sudden change in the control characteristics. This can cause an oscillation of the motor or a sudden change in its operation during the adjustment.

In response to the above issue, one or more aspects of present invention are directed to control that is less likely to cause an overshoot when an actual inertia value is yet to be determined.

Solution to Problem

In response to the above issue, an adjustment apparatus according to one aspect of the present invention adjusts a control parameter for a servomotor. The adjustment apparatus includes a gain adjustment unit that adjusts a position proportional gain and a velocity proportional gain in parallel. The position proportional gain is used in position control performed in a servo driver for controlling the servomotor. The velocity proportional gain is used in velocity control performed in the servo driver. When the servo driver is yet to determine an actual inertia value of a load machine, the gain adjustment unit sets a ratio of the position proportional gain to the velocity proportional gain to a value smaller than a ratio set when the servo driver has determined the actual inertia value of the load machine.

When the actual inertia value of the load machine is yet to be determined, the adjustment apparatus with this structure sets the ratio of the position proportional gain to the velocity proportional gain to a value smaller than the ratio set when the servo driver has determined the actual inertia value of the load machine. In this case, the damping coefficient in a transfer function for the position control performed in the servo driver is greater than a damping coefficient used when the actual inertia value of the load machine has been determined. The adjustment apparatus thus enables the servo driver to perform control that is less likely to cause an overshoot when the actual inertia value of the load machine is yet to be determined.

In some embodiments, when the servo driver is yet to determine the actual inertia value of the load machine, the gain adjustment unit sets the ratio to a value smaller than the ratio set when the servo driver has determined the actual inertia value of the load machine in accordance with an estimated maximum value of an inertia value of the load machine.

The adjustment apparatus with this structure sets the ratio in accordance with the estimated maximum value of the inertia value of the load machine. The adjustment apparatus sets the ratio for the least stable actual control based on the estimated maximum value of the inertia value of the load machine. The development adjustment apparatus thus enables the servo driver to perform control that is less likely to cause an overshoot when the actual inertia value of the load machine is yet to be determined.

In some embodiments, the adjustment apparatus further includes an inertia reception unit that receives, from the servo driver, an inertia value of a load machine controlled by the servo driver. In a period in which the inertia reception unit receives, from the servo driver, an initial inertia value used when the actual inertia value of the load machine is yet to be determined, the gain adjustment unit sets the ratio to a value obtained by multiplying a value set when the servo driver has determined the actual inertia value of the load machine by the initial inertia value divided by the maximum value.

The adjustment apparatus with this structure sets the ratio to a value obtained by multiplying the value set when the actual inertia value of the load machine has been determined by the initial inertia value divided by the maximum value. In this case, the adjustment apparatus can have a damping coefficient equal to or greater than a predetermined value independently of any deviation of the initial inertia value from the actual inertia value. The adjustment apparatus thus enables the servo driver to perform control without causing an overshoot when the actual inertia value of the load machine is yet to be determined.

In some embodiments, the gain adjustment unit gradually increases the position proportional gain and the velocity proportional gain from initial values until optimum response is obtained.

The adjustment apparatus with this structure gradually increases the position proportional gain and the velocity proportional gain from the initial values to adjust the gains. The adjustment apparatus thus enables the servo driver to perform control with a gradually increasing amount of control, and to perform control without causing an overshoot.

In some embodiments, when the inertia reception unit receives, from the servo driver, a real inertia value determined as the actual inertia value of the load machine, the gain adjustment unit sets the velocity proportional gain used after the real inertia value is received in a manner to cause a product of the initial inertia value multiplied by the velocity proportional gain set before the real inertia value is received to be equal to a product of the real inertia value multiplied by the velocity proportional gain used after the real inertia value is received.

The adjustment apparatus with this structure sets the velocity proportional gain used after the real inertia value is received to cause the product of the initial inertia value multiplied by the velocity proportional gain set before the real inertia value is received to be equal to the product of the real inertia value multiplied by the velocity proportional gain used after the real inertia value is received. Thus, the adjustment apparatus can adjust the velocity control characteristics of the servo driver gradually without changing them greatly, independently of any large deviation of the initial inertia value from the real inertia value. The adjustment apparatus thus prevents an oscillation and a sudden operational change during control.

In some embodiments, the gain adjustment unit sets the position proportional gain used after the real inertia value is received based on the velocity proportional gain used after the real inertia value is received.

The adjustment apparatus with this structure sets the position proportional gain used after the real inertia value is received based on the velocity proportional gain used after the real inertia value is received. The position proportional gain used after the real inertia value is received is set based on the velocity proportional gain used after the real inertia value is received independently of any large deviation of the initial inertia value from the real inertia value. The adjustment apparatus can use the velocity proportional gain used after the real inertia value is received to determine the position proportional gain to fall within a range in which the position control characteristics are stable. The adjustment apparatus thus enables control that is less likely to cause an overshoot.

In response to the above issue, a method according to another aspect of the present invention is used to adjust a control parameter for a servomotor. The method includes adjusting a position proportional gain and a velocity proportional gain in parallel. The position proportional gain is used in position control performed in a servo driver for controlling the servomotor. The velocity proportional gain is used in velocity control performed in the servo driver. In the gain adjustment process, when the servo driver is yet to determine an actual inertia value of a load machine, a ratio of the position proportional gain to the velocity proportional gain is set to a value smaller than a ratio set when the servo driver has determined the actual inertia value of the load machine.

When the actual inertia value of the load machine is yet to be determined, the control parameter adjustment method sets the ratio of the position proportional gain to the velocity proportional gain to a value smaller than the ratio set when the servo driver has determined the actual inertia value of the load machine. In this case, the damping coefficient in a transfer function for the position control performed in the servo driver is greater than a damping coefficient used when the actual inertia value of the load machine has been determined. The control parameter adjustment method thus enables the servo driver to perform control that is less likely to cause an overshoot when the actual inertia value of the load machine is yet to be determined.

Advantageous Effects

One or more embodiments of the present invention enable control that is less likely to cause an overshoot when an actual inertia value is yet to be determined.

DETAILED DESCRIPTION

First Embodiment

Figure 9:
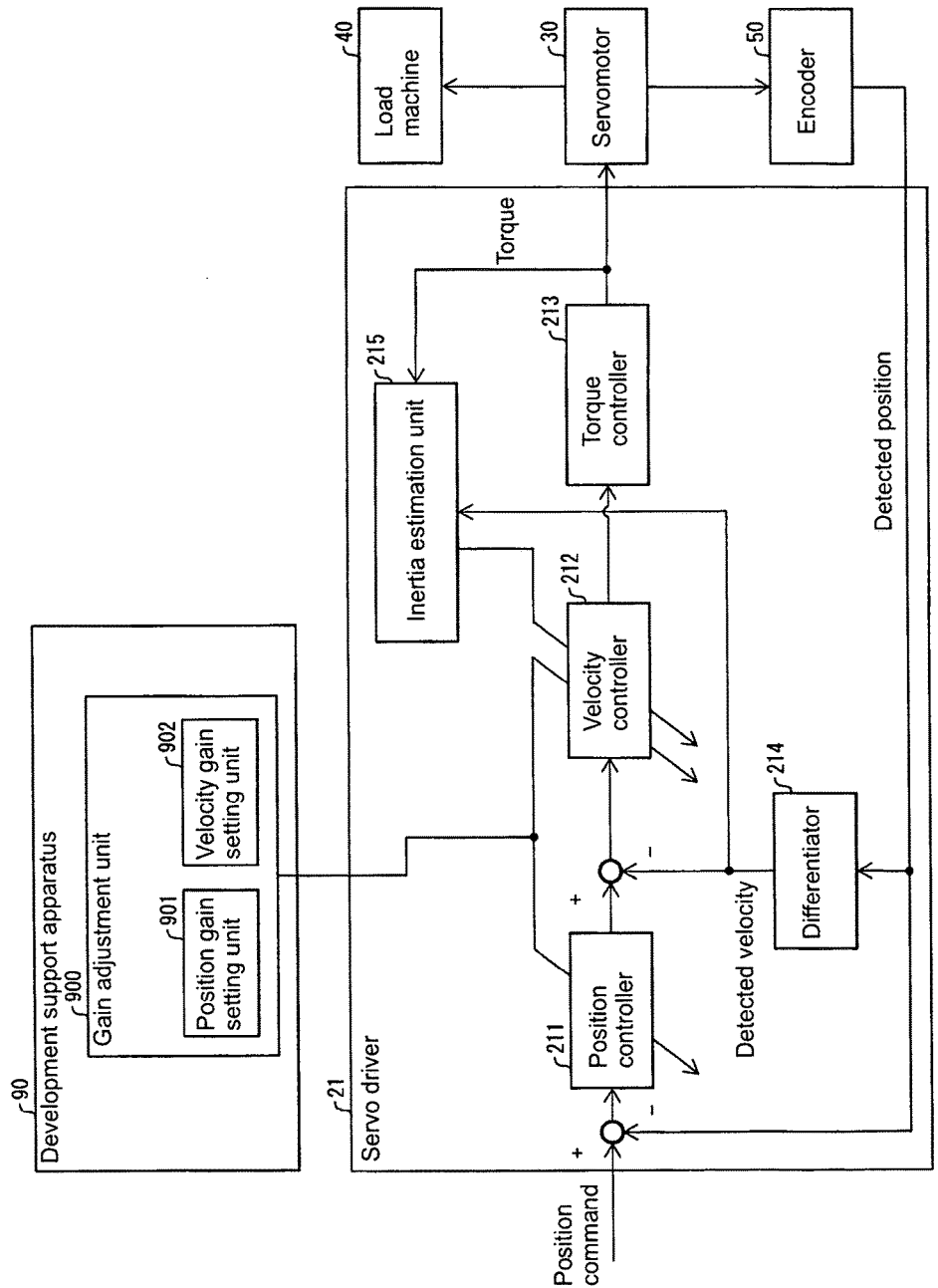
FIG. 9 is a schematic diagram showing a development support apparatus known in the art.
Figure 10:
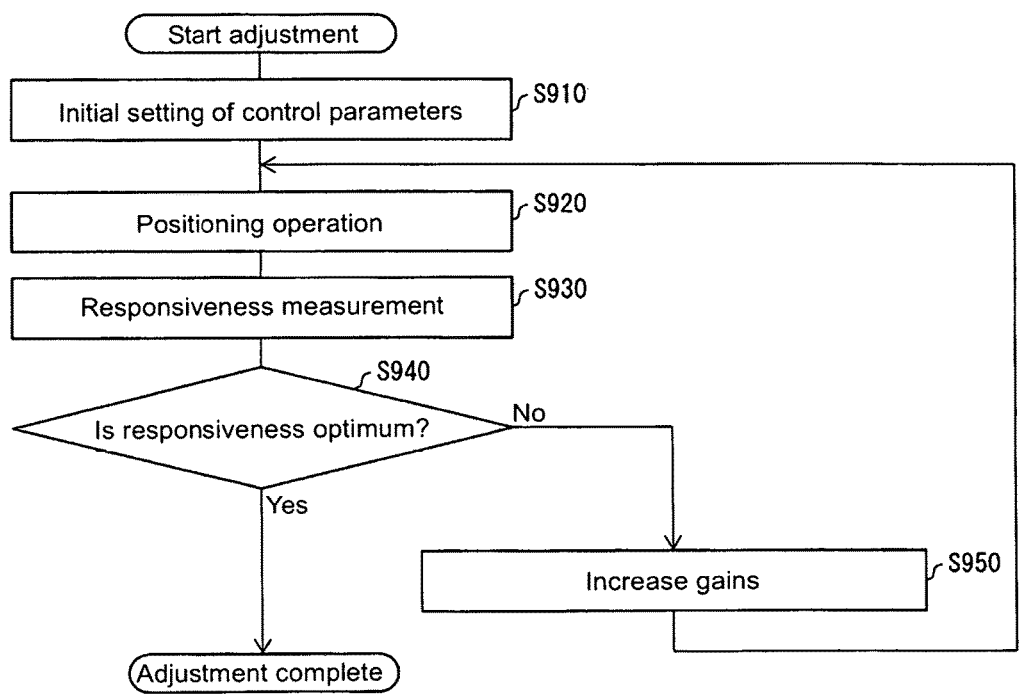
FIG. 10 is a flowchart showing the processing performed by the development support apparatus known in the art.

A first embodiment of the present invention will now be described in detail with reference to FIGS. 1 to 5. The same or corresponding components in the figures are given the same reference numerals, and will not be described redundantly. To facilitate understanding of a development support apparatus 10 (adjustment apparatus for adjusting a control parameter for a servomotor 30) according to one embodiment of the present invention, a control system 1 including the development support apparatus 10 will now be briefly described with reference to FIG. 2. A development support apparatus 90 known in the art described later with reference to FIGS. 9 and 10 is used in the same environment as for the control system 1.

Overview of Control System According to First Embodiment

Figure 2:
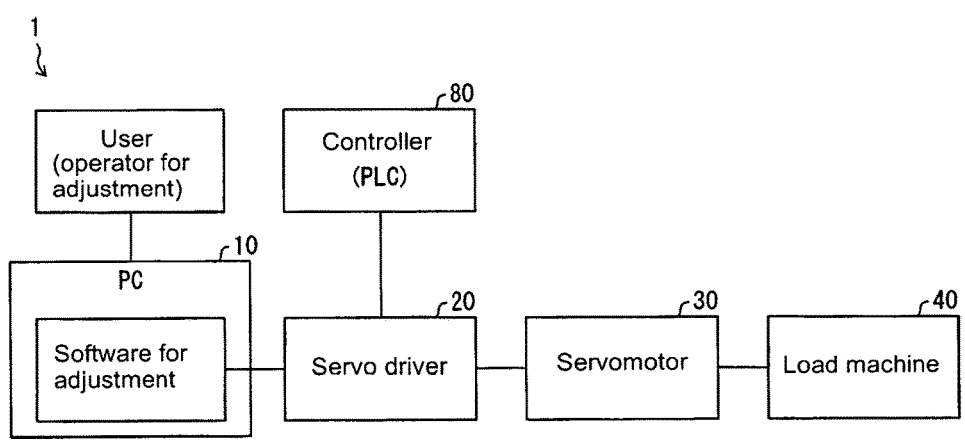
FIG. 2 is a schematic diagram showing a control system including the development support apparatus shown in FIG. 1.

FIG. 2 is a schematic diagram showing the control system 1 including the development support apparatus 10. As shown in FIG. 2, the control system 1 includes the development support apparatus 10, a servo driver 20, the servomotor 30, a load machine 40 driven by the servomotor 30, and a controller (programmable logic controller, or PLC) 80.

The development support apparatus 10 sets and adjusts control parameters used in the servo driver 20. More specifically, the development support apparatus 10 automatically adjusts control parameters (in particular, a position gain and a velocity gain) used in the servo driver 20 to optimize the responsiveness of the servo driver 20. The development support apparatus 10 is, for example, a personal computer. The personal computer executes programs stored in it to function as the development support apparatus 10.

A developer (e.g., a user of the servo system) uses the development support apparatus 10 to set and adjust the control parameters used in the servo driver 20. For example, the user selects a control parameter to be set and adjusted from a plurality of control parameters displayed on the screen of the development support apparatus 10, and sets and adjusts the selected control parameter. The set and adjusted parameter is transferred from the development support apparatus 10 to the servo driver 20.

The servo driver 20 stores the control parameter set and adjusted by the development support apparatus 10. The servo driver 20 drives the servomotor 30 and controls the driving status of the servomotor 30 in accordance with the control parameter. More specifically, the servo driver 20 uses the control parameter set (adjusted) by the development support apparatus 10 to control the servomotor 30 and cause the servomotor 30 to drive the load machine 40. A command for the servo driver 20 for operating the motor may be provided through, for example, the setting performed by the development support apparatus 10 or based on an input from an upper controller (not shown) (e.g., the controller 80 in FIG. 2). More specifically, the servo driver 20 receives a control signal from the controller 80, and controls the servomotor 30 based on the received control signal. For example, the servo driver 20 drives the servomotor 30 based on the control signal to cause the servomotor 30 to rotate at a predetermined rotational speed and by a predetermined rotation amount. The servo driver 20 further estimates the inertia value of a control target (e.g., the servomotor 30, and the load machine 40 driven by the servomotor 30). The servo driver 20 stores the internally estimated inertia value, and uses the inertia value to drive the servomotor 30 as a control parameter.

The controller 80 transmits a command (control signal) for drive control (e.g., positioning control) of the servomotor 30 to the servo driver 20 to control the servo driver 20. The controller 80 controls the servo driver 20 by, for example, transmitting a control signal to the servo driver 20 storing the control parameter set and adjusted by the development support apparatus 10.

The servo driver 20 is connected to each of the development support apparatus 10, the servomotor 30, and the controller 80 in a communicable manner with any wired connection scheme or any wireless connection scheme. For example, the development support apparatus 10 and the servo driver 20 are connected with any communication cable, or for example, a universal serial bus (USB) cable. The servo driver 20 and the servomotor 30 may be connected with a dedicated cable. The servo driver 20 and the controller 80 may be connected with, for example, EtherCAT (registered trademark).

The control system 1 including the development support apparatus 10 has been briefly described with reference to FIG. 2. To facilitate understanding of the development support apparatus 10, the development support apparatus 90 known in the art will now be described with reference to FIGS. 9 and 10. The development support apparatus 90 known in the art is used in the same environment as for the control system 1. More specifically, the development support apparatus 90 known in the art is connected to a servo driver 21 in a communicable manner, and sets and adjusts control parameters stored in the servo driver 21 in the same manner as the development support apparatus 10 according to one embodiment of the present invention. The servo driver 21 stores control parameters set and adjusted by the development support apparatus 90 known in the art. The servo driver 21 drives the servomotor 30 and controls the driving status of the servomotor 30 in accordance with the control parameters.

Known Development Support Apparatus

FIG. 9 is a schematic diagram showing the development support apparatus 90 known in the art. The development support apparatus 90 automatically adjusts control parameters (more specifically, a position gain and a velocity gain) used in the servo driver 21 to optimize the responsiveness of the servo driver 21. The development support apparatus 90 includes a gain adjustment unit 900 known in the art. The gain adjustment unit 900 known in the art includes a position gain setting unit 901, which sets and adjusts the position gain, and a velocity gain setting unit 902, which sets and adjusts the velocity gain. The development support apparatus 90 known in the art improves the responsivity by gradually increasing the position gain used in a position controller 211 and the velocity gain used in a velocity controller 212 to determine the optimum gains (the position gain and the velocity gain).

The servo driver 21 uses the control parameters set by the development support apparatus 90 known in the art (more specifically, the position gain and the velocity gain) and the internally estimated control parameter (more specifically, the inertia value of the load machine 40, and of the servomotor 30) to control the servomotor 30. More specifically, the servo driver 21 uses the position gain and the velocity gain set by the development support apparatus 90 known in the art and the internally estimated inertia value to cause the servomotor 30 to drive the load machine 40. The servo driver 21 includes the position controller 211, the velocity controller 212, a torque controller 213, a differentiator 214, and an inertia estimation unit 215.

The position controller 211 performs, for example, proportional control (P control). More specifically, the position controller 211 outputs a velocity command $v_{cmd}$ based on a positional deviation of a position command $p_{cmd}$, which is provided from an external source (e.g., from a user), from a feedback position $p_{fb}$, which is obtained from an encoder 50. The position controller 211 has a position proportional gain $K_{pp}$, which serves as a control parameter. The relationship between the position command $p_{cmd}$, the feedback position $p_{fb}$, the velocity command $v_{cmd}$, and the position proportional gain $K_{pp}$ can be written as: $v_{cmd} = K_{pp}*(p_{cmd}-p_{fb})$.

The velocity controller 212 performs, for example, proportional integral control (PI control). More specifically, the velocity controller 212 outputs a torque command $\tau_{cmd}$ based on a velocity deviation of the velocity command $v_{cmd}$ from a feedback velocity $v_{fb}$ (detected velocity) calculated by the differentiator 214 based on the feedback position $p_{fb}$ obtained from the encoder 50. The velocity controller 212 has a velocity proportional gain $K_{vp}$, a velocity integral gain $K_{vi}$, and an inertia set value $J_c$ as control parameters. The relationship between the velocity command $v_{cmd}$, the feedback velocity $v_{fb}$, the torque command $\tau_{cmd}$, the velocity proportional gain $K_{vp}$, the velocity integral gain $K_{vi}$, and the inertia set value $J_c$ can be written as: $\tau_{cmd}=J_c*K_{vp}*(1+K_{vi}/s)*(v_{cmd}-v_{fb})$, where the inertia set value $J_c$ is the inertia value of the load machine 40 (and the servomotor 30) estimated by the inertia estimation unit 215 (described later), and s is the Laplace operator.

The torque controller 213 controls the servomotor 30 based on the torque command $\tau_{cmd}$ generated by the velocity controller 212. The differentiator 214 calculates a feedback velocity $v_{fb}$ based on the feedback position $p_{fb}$ obtained from the encoder 50, and transmits information indicating the calculated feedback velocity $v_{fb}$ to the inertia estimation unit 215.

The inertia estimation unit 215 estimates the inertia value of the load machine 40 (and the servomotor 30) based on the feedback velocity $v_{fb}$ (detected velocity) and the torque provided by the torque controller 213 to the servomotor 30 based on the torque command $\tau_{cmd}$. More specifically, the inertia estimation unit 215 estimates the inertia value of the load machine 40 (and the servomotor 30) based on the feedback velocity $v_{fb}$ and the torque provided to the servomotor 30.

Hereafter, a period during which the inertia estimation unit 215 is yet to determine (estimate) the actual inertia value (real inertia value $J_p$) of the load machine 40 (and the servomotor 30) may be referred to as an unadjusted period. The inertia value of the load machine 40 (and the servomotor 30) estimated by the inertia estimation unit 215 in the unadjusted period may be referred to as the initial inertia value.

The servo driver 21 uses, as appropriate, the inertia value of the load machine 40 (and the servomotor 30) estimated by the inertia estimation unit 215 as a control parameter for controlling the servomotor 30. More specifically, the inertia value of the load machine 40 (and the servomotor 30) estimated by the inertia estimation unit 215 is used by the velocity controller 212 as an inertia set value $J_c$.

The encoder 50 detects the position of the servomotor 30, and for example, the rotational angle of the servomotor 30. The encoder 50 transmits information indicating the detected position to the servo driver 21. The encoder 50 may also detect the velocity of the servomotor 30 and transmit information indicating the detected velocity to the servo driver 21. In this case, the servo driver 21 may not include the differentiator 214, which calculates the velocity of the servomotor 30 based on the position of the servomotor 30 detected by the encoder 50.

A command for operating the servomotor 30 may be provided through the setting performed by the development support apparatus 90 known in the art or based on an input from an upper controller (not shown) (e.g., the controller 80 in FIG. 2).

FIG. 10 is a flowchart showing the processing performed by the development support apparatus 90 known in the art. More specifically, FIG. 10 is a flowchart showing an adjustment process implemented by the development support apparatus 90 known in the art to adjust the position gain and the velocity gain (adjustment process). The development support apparatus 90 known in the art first performs the initial setting of the control parameters (S910). More specifically, the development support apparatus 90 known in the art transmits information indicating the initial values of the position gain and the velocity gain to the servo driver 21.

Subsequently, the development support apparatus 90 known in the art provides a command for the servo driver 21 to drive and position the servomotor 30 (as a trial) (S920). More specifically, the development support apparatus 90 known in the art causes the servo driver 21 to operate the servomotor 30 using the received initial values of the position gain and the velocity gain. The servomotor 30 thus drives the load machine 40. The development support apparatus 90 known in the art (or the servo driver 21) measures the responsiveness (S930). More specifically, the development support apparatus 90 obtains the results of the positioning operation performed using the initial values of the position gain and the velocity gain from, for example, the encoder 50. The development support apparatus 90 determines whether the responsiveness is optimum based on the measured responsiveness (e.g., the positioning results obtained from the encoder 50) (S940).

When determining that the responsiveness is not optimum (No in S940), the development support apparatus 90 increases the gains (the position gain and the velocity gain) (S950). More specifically, the development support apparatus 90 known in the art transmits, to the servo driver 21, information indicating the position gain and the velocity gain set higher than those corresponding to the responsiveness that has been determined not to be optimum. The processing from S920 to S940 is repeated. More specifically, the development support apparatus 90 known in the art improves the responsivity of the servo driver 21 by gradually increasing the position gain and the velocity gain. When determining that the responsiveness is optimum (Yes in S940), the development support apparatus 90 ends the adjustment, or in other words determines the optimum gains (the position gain and the velocity gain).

The development support apparatus 90 known in the art improves the responsivity by gradually increasing the position gain (specifically the position proportional gain $K_{pp}$) and the velocity gain (specifically the velocity proportional gain $K_{vp}$ and the velocity integral gain $K_{vi}$), and ends the adjustment when the responsiveness is optimum.

The inertia value of the load machine 40 (and the servomotor 30) is estimated by the inertia estimation unit 215 in the servo driver 21 in parallel with the processing of the development support apparatus 90 known in the art, for example, the processing in S930. In other words, the inertia estimation unit 215 estimates the inertia value of the load machine 40 (and the servomotor 30) and updates the inertia set value $J_c$ used by the velocity controller 212 independently of the processing for adjusting the position gain and the velocity gain performed by the development support apparatus 90 known in the art.

As described above, the values of the position gain and the velocity gain of the control parameters used in the servo driver 21 are set by the development support apparatus 90 known in the art. However, among the control parameters used in the servo driver 21, the inertia set value $J_c$ is automatically estimated in the servo driver 21, in particular, estimated by the inertia estimation unit 215. In other words, the values of the position gain and the velocity gain of the control parameters used in the servo driver 21 are set and adjusted by the development support apparatus 90 known in the art independently of the inertia value of the load machine 40 (and the servomotor 30) estimated by the inertia estimation unit 215 in the servo driver 21.

When the inertia estimation unit 215 is yet to determine the actual inertia value (real inertia value $J_p$) of the load machine 40 (and the servomotor 30), the situations described below may occur. When the inertia value of the load machine 40 (and the servomotor 30) estimated by the inertia estimation unit 215 (the inertia set value $J_c$ used by the velocity controller 212) greatly deviates from the characteristics of the actual control target (e.g., the actual inertia value, or the real inertia value $J_p$, of the load machine 40, and of the servomotor 30), the stability of the position control performed in the servo driver 21 may decrease. This may cause a large overshoot during the adjustment.

Additionally, changing the inertia set value $J_c$ set in the servo driver 21, or the inertia value of the load machine 40 (and the servomotor 30) estimated by the inertia estimation unit 215, may suddenly change the control characteristics of the servo driver 21. This may cause technical issues such as an oscillation of the motor and a sudden change in its operation during such adjustment. In particular, when the inertia estimation unit 215 changes the estimated inertia value of the load machine 40 (and the servomotor 30), the inertia set value $J_c$ used by the velocity controller 212 may be changed. This may suddenly change the control characteristics of the velocity controller 212.

These issues for the development support apparatus 90 known in the art described briefly above may be specifically classified into two issues (issues 1 and 2).

Issue 1 with Known Technique

During adjustment of the control parameters, the development support apparatus 90 known in the art sets the position gain (e.g., the position proportional gain $K_{pp}$) and the velocity gain (e.g., the velocity proportional gain $K_{vp}$ and the velocity integral gain $K_{vi}$) transmitted to the servo driver 21 in accordance with, for example, a parameter table. The parameter table used by the development support apparatus 90 known in the art is designed to provide gain combinations (the position gain and the velocity gain) that stabilize the position control performed in the servo driver 21. However, when the inertia set value $J_c$ in an unadjusted period (or when the inertia estimation unit 215 is yet to determine the actual inertia value, or the real inertia value $J_p$, of the load machine 40, and of the servomotor 30) greatly deviates from the actual machine characteristics (e.g., the real inertia value $J_p$), the stability of the position control may decrease as unintended by the parameter table.

Issue 2 with Known Technique

When the inertia estimation unit 215 included in the servo driver 21 automatically updates the inertia set value $J_c$ to a larger value, the characteristics of the velocity controller 212 in the servo driver 21 may change suddenly. This may cause unfavorable phenomena such as an oscillation of the servomotor 30 (load machine 40) and a sudden change in its operation.

In response to the issue 1 with the development support apparatus 90 known in the art, the development support apparatus 10 according to one embodiment of the present invention sets the gains used before the inertia is estimated (or in the unadjusted period) to stabilize the position control performed in the servo driver 20 independently of any large deviation of the unadjusted inertia set value $J_c$ from the actual machine characteristics (the actual inertia value, or the real inertia value $J_p$, of the load machine 40, and of the servomotor 30). The development support apparatus 10 sets the position gain and the velocity gain in an unadjusted period to stabilize the position control performed in the servo driver 20 independently of any large deviation of the actual machine characteristics from an inertia set value $J_c$ set when the inertia estimation unit 215 is yet to determine the real inertia value $J_p$ of the load machine 40 (and the servomotor 30). In other words, the development support apparatus 10 adjusts the inertia value, the position gain, and the velocity gain to achieve the constantly stable relationship between them both before and during the adjustment of the control parameters. Thus, the development support apparatus 10 can adjust the control parameters such as the inertia value, the position gain, and the velocity gain in a safe manner, and perform control that is less likely to cause an overshoot.

To facilitate understanding of the development support apparatus 10, the development support apparatus 10 will now be described briefly. The development support apparatus 10 adjusts the control parameters for the servomotor 30. The development support apparatus 10 includes a gain adjustment unit 100, which adjusts a position proportional gain $K_{pp}$ and a velocity proportional gain $K_{vp}$ in parallel. The position proportional gain $K_{pp}$ is used in position control performed in the servo driver 20 for controlling the servomotor 30. The velocity proportional gain $K_{vp}$ is used in velocity control performed in the servo driver 20. When the servo driver 20 is yet to determine the actual inertia value $J_p$ of the load machine 40 (and the servomotor 30), the gain adjustment unit 100 sets the ratio of the position proportional gain $K_{pp}$ to the velocity proportional gain $K_{vp}$ to a value smaller than the ratio set when the servo driver 20 has determined the actual inertia value $J_p$ of the load machine 40 (and the servomotor 30).

When the actual inertia value $J_p$ of the load machine 40 (and the servomotor 30) is yet to be determined, the development support apparatus 10 with this structure sets the ratio of the position proportional gain $K_{pp}$ to the velocity proportional gain $K_{vp}$ to a value smaller than the ratio set when the servo driver 20 has determined the actual inertia value $J_p$ of the load machine 40 (and the servomotor 30). In this case, the damping coefficient $\zeta$ in a transfer function for the position control performed in the servo driver 20 is greater than a damping coefficient $\zeta$ used when the actual inertia value $J_p$ of the load machine 40 (and the servomotor 30) has been determined. The development support apparatus 10 thus enables the servo driver 20 to perform control that is less likely to cause an overshoot when the actual inertia value $J_p$ of the load machine 40 (and the servomotor 30) is yet to be determined.

When the servo driver 20 is yet to determine the actual inertia value $J_p$ of the load machine 40 (and the servomotor 30), the gain adjustment unit 100 in the development support apparatus 10 sets the ratio (of the position proportional gain $K_{pp}$ to the velocity proportional gain $K_{vp}$) to a value smaller than the ratio set when the servo driver 20 has determined the actual inertia value $J_p$ of the load machine 40 (and the servomotor 30) in accordance with the estimated maximum value $J_{max}$ of the inertia value of the load machine 40 (and the servomotor 30).

The development support apparatus 10 with this structure sets the ratio in accordance with the estimated maximum value $J_{max}$ of the inertia value of the load machine 40 (and the servomotor 30). The development support apparatus 10 sets the ratio for the least stable actual control based on the estimated maximum value $J_{max}$ of the inertia value of the load machine 40 (and the servomotor 30). The development support apparatus 10 thus enables the servo driver 20 to perform control that is less likely to cause an overshoot when the actual inertia value $J_p$ of the load machine 40 (and the servomotor 30) is yet to be determined.

The development support apparatus 10 further includes an apparatus reception unit 112 (inertia reception unit) that receives, from the servo driver 20, the inertia value (estimated by an inertia estimation unit 209, or the inertia set value $J_c$) of the load machine 40 (and the servomotor 30) controlled by the servo driver 20. In a period in which the apparatus reception unit 112 receives, from the servo driver 20, the initial inertia value $J_0$ used when the actual inertia value $J_p$ of the load machine 40 (and the servomotor 30) is yet to be determined, the gain adjustment unit 100 sets the ratio to a value obtained by multiplying a value set when the servo driver 20 has determined the actual inertia value $J_p$ of the load machine 40 (and the servomotor 30) by the initial inertia value $J_0$ divided by the maximum value $J_{max}$.

The development support apparatus 10 with this structure sets the ratio to a value obtained by multiplying the value set when the actual inertia value $J_p$ of the load machine 40 (and the servomotor 30) has been determined by the initial inertia value $J_0$ divided by the maximum value $J_{max}$. In this case, the development support apparatus 10 can have a damping coefficient ζ equal to or greater than a predetermined value independently of any deviation of the initial inertia value $J_0$ from the actual inertia value $J_p$. The development support apparatus 10 thus enables the servo driver 20 to perform control without causing an overshoot when the actual inertia value $J_p$ of the load machine 40 (and the servomotor 30) is yet to be determined.

The gain adjustment unit 100 gradually increases the position proportional gain $K_{pp}$ and the velocity proportional gain $K_{vp}$ from initial values until optimum response is obtained.

The development support apparatus 10 with this structure gradually increases the position proportional gain $K_{pp}$ and the velocity proportional gain $K_{vp}$ from the initial values to adjust the gains. The development support apparatus 10 thus enables the servo driver 20 to perform control with a gradually increasing amount of control, and to perform control without causing an overshoot.

The development support apparatus 10 described briefly above and the servo driver 20 for controlling the driving status of the servomotor 30 using the control parameters set (adjusted) by the development support apparatus 10 will now be described in detail with reference to FIGS. 1, 3, and 4.

Figure 1:
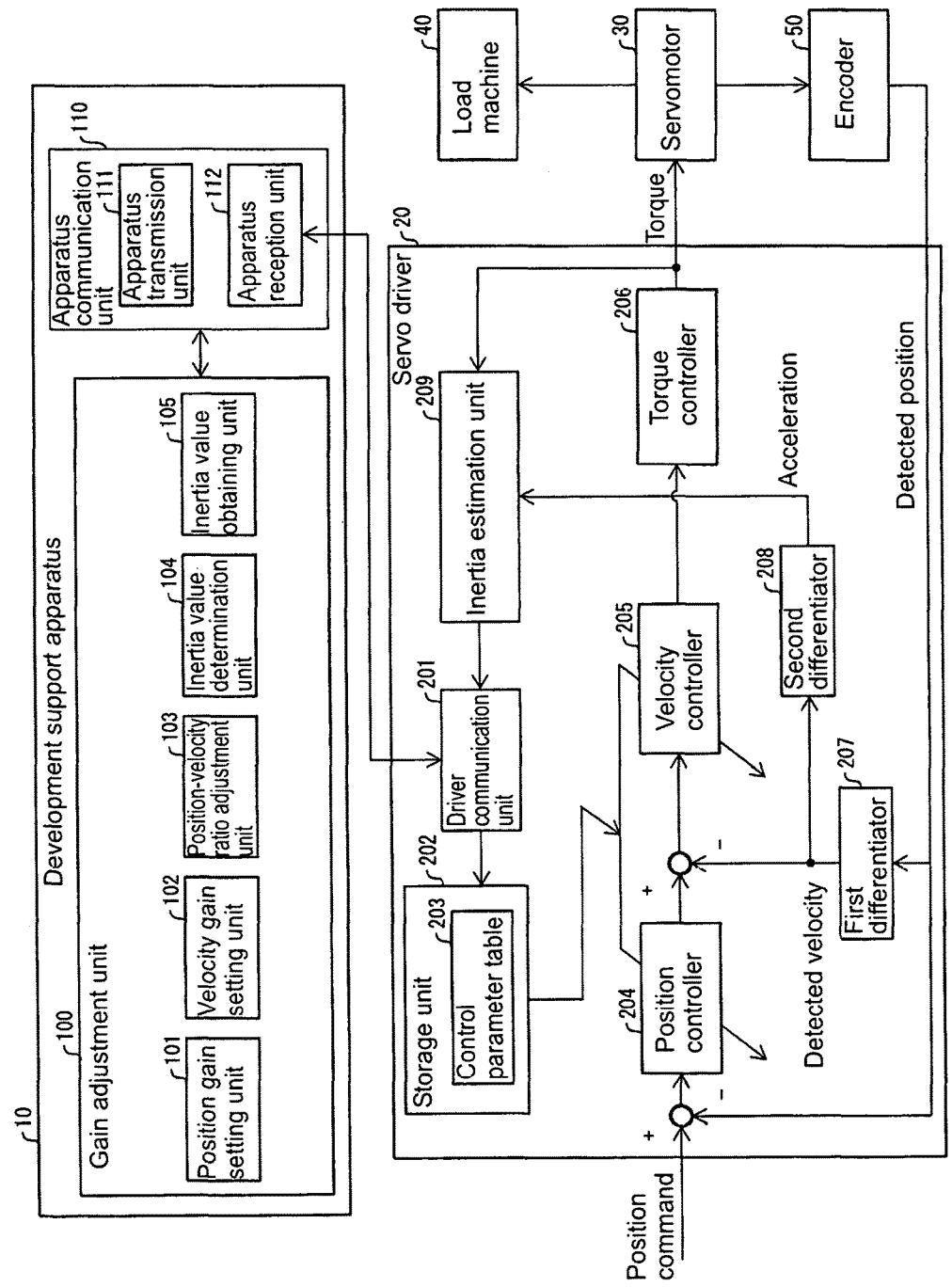
FIG. 1 is a block diagram showing the main components of a development support apparatus according to a first embodiment of the present invention.

Details of Development Support Apparatus According to Embodiment of Present Invention FIG. 1 is a block diagram showing the main components of the development support apparatus 10. The development support apparatus 10 automatically adjusts the control parameters used in the servo driver 20 to optimize the responsiveness of the servo driver 20. The development support apparatus 10 includes the gain adjustment unit 100 and an apparatus communication unit 110. The gain adjustment unit 100 gradually increases the position gain (position proportional gain $K_{pp}$) and the velocity gain (velocity proportional gain $K_{vp}$) from the initial values until optimum response is obtained.

In the example described below, the position gain and the velocity gain adjusted and controlled by the development support apparatus 10 (gain adjustment unit 100) and used by the servo driver 20 are the position proportional gain $K_{pp}$ and the velocity proportional gain $K_{vp}$. Unless otherwise specified, the position gain hereafter refers to the position proportional gain $K_{pp}$, and the velocity gain hereafter refers to the velocity proportional gain $K_{vp}$.

When the servo driver 20 is yet to determine the actual inertia value $J_p$ of the load machine 40 (and the servomotor 30), or more specifically, in the period in which the apparatus reception unit 112 receives, from the servo driver 20, the initial inertia value $J_0$ used when the actual inertia value $J_p$ of the load machine 40 (and the servomotor 30) is yet to be determined, the gain adjustment unit 100 sets the ratio of the position proportional gain $K_{pp}$ to the velocity proportional gain $K_{vp}$ (hereafter simply referred to as the velocity-position ratio) in the manner described below. The gain adjustment unit 100 sets the velocity-position ratio to a value smaller than the ratio set when the servo driver 20 has determined the actual inertia value $J_p$ of the load machine 40 (and the servomotor 30). In particular, the gain adjustment unit 100 sets the velocity-position ratio to a value smaller than the ratio set when the servo driver 20 has determined the actual inertia value $J_p$ of the load machine 40 (and the servomotor 30) in accordance with the estimated maximum value $J_{max}$ of the inertia value of the load machine 40 (and the servomotor 30). The gain adjustment unit 100 sets, for example, the ratio of the position proportional gain $K_{pp}$ to the velocity proportional gain $K_{vp}$ to a value obtained by multiplying the value set when the servo driver 20 has determined the actual inertia value $J_p$ of the load machine 40 (and the servomotor 30) by the initial inertia value $J_0$ divided by the maximum value $J_{max}$ (the estimated maximum value of the inertia value of the load machine 40, and of the servomotor 30).

The gain adjustment unit 100 includes a position gain setting unit 101, a velocity gain setting unit 102, a position-velocity ratio adjustment unit 103, an inertia value determination unit 104, and an inertia value obtaining unit 105. The position gain setting unit 101 generates the position gain used by a position controller 204 included in the servo driver 20. The velocity gain setting unit 102 generates the velocity gain used by a velocity controller 205 included in the servo driver 20. The position gain and the velocity gain generated by the position gain setting unit 101 and the velocity gain setting unit 102 are transmitted to the position-velocity ratio adjustment unit 103.

The position-velocity ratio adjustment unit 103 adjusts the ratio between the position gain generated by the position gain setting unit 101 and the velocity gain generated by the velocity gain setting unit 102. The position-velocity ratio adjustment unit 103 sets the velocity-position ratio, or specifically adjusts the values of the position gain and the velocity gain to allow the ratio of the position gain to the velocity gain (or the velocity-position ratio) to fall within a predetermined range.

The position-velocity ratio adjustment unit 103 adjusts the velocity-position ratio particularly based on whether the servo driver 20 has determined the actual inertia value $J_p$ of the load machine 40 (and the servomotor 30). More specifically, the position-velocity ratio adjustment unit 103 adjusts the velocity-position ratio based on whether the inertia value obtained by the inertia value obtaining unit 105 (apparatus reception unit 112) from the servo driver 20 is the initial inertia value $J_0$ used when the servo driver 20 is yet to determine the actual inertia value $J_p$ of the load machine 40 (and the servomotor 30) or the actual inertia value $J_p$ of the load machine 40 (and the servomotor 30) determined by the inertia estimation unit 209.

When receiving the determination result indicating that the servo driver 20 has not determined the actual inertia value $J_p$ of the load machine 40 (and the servomotor 30) from the inertia value determination unit 104, or specifically when the inertia value obtained by the inertia value obtaining unit 105 is the initial inertia value $J_0$, the position-velocity ratio adjustment unit 103 sets the velocity-position ratio in the manner described below. The position-velocity ratio adjustment unit 103 sets the velocity-position ratio to a value smaller than the ratio set when the servo driver 20 has determined the actual inertia value $J_p$ of the load machine 40 (and the servomotor 30), or in particular to a value smaller than the ratio set when the actual inertia value $J_p$ has been determined in accordance with the estimated maximum value $J_{max}$ of the inertia value of the load machine 40 (and the servomotor 30). The position-velocity ratio adjustment unit 103 sets, for example, the velocity-position ratio to a value obtained by multiplying the value set when the servo driver 20 has determined the actual inertia value $J_p$ of the load machine 40 (and the servomotor 30) by the initial inertia value $J_0$ divided by the maximum value $J_{max}$.

The position-velocity ratio adjustment unit 103 transmits the position gain (position proportional gain $K_{pp}$) and the velocity gain (velocity proportional gain $K_{vp}$) adjusted to achieve the intended velocity-position ratio to the servo driver 20 through an apparatus transmission unit 111. To achieve the intended velocity-position ratio (the ratio of the position proportional gain $K_{pp}$ to the velocity proportional gain $K_{vp}$), the position-velocity ratio adjustment unit 103 may fix the value of the position gain (position proportional gain $K_{pp}$) generated by the position gain setting unit 101 and adjust the value of the velocity gain (velocity proportional gain $K_{vp}$) generated by the velocity gain setting unit 102. To achieve the intended velocity-position ratio, the position-velocity ratio adjustment unit 103 may fix the value of the velocity proportional gain $K_{vp}$ generated by the velocity gain setting unit 102 and adjust the value of the position proportional gain $K_{pp}$ generated by the position gain setting unit 101. To achieve the intended velocity-position ratio, the position-velocity ratio adjustment unit 103 may adjust the value of the position proportional gain $K_{pp}$ generated by the position gain setting unit 101 and the value of the velocity proportional gain $K_{vp}$ generated by the velocity gain setting unit 102 as appropriate. The position gain (position proportional gain $K_{pp}$) and the velocity gain (velocity proportional gain $K_{vp}$) adjusted by the position-velocity ratio adjustment unit 103 to achieve the intended velocity-position ratio are to be transmitted to the servo driver 20 through the apparatus transmission unit 111.

When receiving the determination result indicating that the servo driver 20 has determined the actual inertia value $J_p$ of the load machine 40 (and the servomotor 30) from the inertia value determination unit 104, or specifically when the inertia value obtained by the inertia value obtaining unit 105 is the actual inertia value $J_p$ of the load machine 40 (and the servomotor 30) determined by the servo driver 20, the position-velocity ratio adjustment unit 103 (gain adjustment unit 100) performs the processing described below. The gain adjustment unit 100 (position-velocity ratio adjustment unit 103) gradually increases (raises) the values of the position proportional gain $K_{pp}$ generated by the position gain setting unit 101 and the velocity proportional gain $K_{vp}$ generated by the velocity gain setting unit 102 until optimum response from the servo driver 20 is obtained. The gain adjustment unit 100 (position-velocity ratio adjustment unit 103) improves the responsivity of the servo driver 20 by gradually increasing the position proportional gain $K_{pp}$ and the velocity proportional gain $K_{vp}$ to determine the optimum set values (optimum position proportional gain $K_{pp}$ and velocity proportional gain $K_{vp}$).

The processing performed by the position-velocity ratio adjustment unit 103 described above can now be summarized. The position-velocity ratio adjustment unit 103 obtains the position gain generated by the position gain setting unit 101 and the velocity gain generated by the velocity gain setting unit 102 from the position gain setting unit 101 and the velocity gain setting unit 102. The position-velocity ratio adjustment unit 103 also obtains, from the inertia value determination unit 104, the result of determination as to whether the servo driver 20 has determined the actual inertia value $J_p$ of the load machine 40 (and the servomotor 30), or in other words whether the inertia value obtained by the inertia value obtaining unit 105 (apparatus reception unit 112) is the initial inertia value $J_0$ or the actual inertia value $J_p$. The position-velocity ratio adjustment unit 103 further obtains the initial inertia value $J_0$ and the estimated maximum value $J_{max}$ of the inertia value of the load machine 40 (and the servomotor 30) or the actual inertia value $J_p$ of the load machine 40 (and the servomotor 30) from the inertia value obtaining unit 105.

When the inertia value obtained by the inertia value obtaining unit 105 is the initial inertia value $J_0$, the position-velocity ratio adjustment unit 103 adjusts the values of the position gain and the velocity gain to allow the ratio between the position gain (position proportional gain $K_{pp}$) and the velocity gain (velocity proportional gain $K_{vp}$) (velocity-position ratio) to fall within a predetermined range. The position-velocity ratio adjustment unit 103 transmits information indicating the adjusted position gain and the adjusted velocity gain to the servo driver 20 through the apparatus transmission unit 111 to allow the servo driver 20 to use these adjusted gains as control parameters.

The position-velocity ratio adjustment unit 103 sets the velocity-position ratio to a value smaller than the ratio set when the servo driver 20 has determined the actual inertia value $J_p$ of the load machine 40 (and the servomotor 30), or in particular to a value smaller than the ratio set when the actual inertia value $J_p$ has been determined in accordance with the estimated maximum value $J_{max}$ of the inertia value of the load machine 40 (and the servomotor 30). The position-velocity ratio adjustment unit 103 sets, for example, the velocity-position ratio to a value obtained by multiplying the value set when the servo driver 20 has determined the actual inertia value $J_p$ of the load machine 40 (and the servomotor 30) by the initial inertia value $J_0$ divided by the maximum value $J_{max}$. As described above, the position-velocity ratio adjustment unit 103 obtains, for example, the initial inertia value $J_0$, and the estimated maximum value $J_{max}$ of the inertia value of the load machine 40 (and the servomotor 30) from the inertia value obtaining unit 105.

The inertia value determination unit 104 determines whether the servo driver 20 has determined the actual inertia value $J_p$ of the load machine 40 (and the servomotor 30). More specifically, the inertia value determination unit 104 determines whether the inertia value obtained by the inertia value obtaining unit 105 (apparatus reception unit 112) from the servo driver 20 is the initial inertia value $J_0$ used when the servo driver 20 is yet to determine the actual inertia value $J_p$ of the load machine 40 (and the servomotor 30) or the actual inertia value $J_p$ of the load machine 40 (and the servomotor 30) determined by the inertia estimation unit 209. The inertia value determination unit 104 transmits the determination result to the position-velocity ratio adjustment unit 103.

The inertia value determination unit 104 obtains, for example, identification information (described later) from the servo driver 20 through the apparatus reception unit 112, and uses the identification information to determine whether the inertia value obtained by the inertia value obtaining unit 105 from the servo driver 20 is the initial inertia value $J_0$ or the actual inertia value $J_p$. The identification information is output from the servo driver 20 and is used to determine whether the inertia estimation unit 209 in the servo driver 20 has determined (estimated) the actual inertia value $J_p$ of the load machine 40 (and the servomotor 30). Any other method may be used to allow the inertia value determination unit 104 to determine whether the servo driver 20 has determined the actual inertia value $J_p$ of the load machine 40 (and the servomotor 30) and transmit the determination result to the position-velocity ratio adjustment unit 103. For example, the inertia value determination unit 104 may determine that the servo driver 20 has determined the actual inertia value $J_p$ of the load machine 40 (and the servomotor 30) when inertia values obtained by the inertia value obtaining unit 105 (apparatus reception unit 112) at predetermined time intervals from the servo driver 20 are the same value at least a predetermined number of times. In other words, the inertia value determination unit 104 may determine that the inertia value obtained by the inertia value obtaining unit 105 is the actual inertia value $J_p$ of the load machine 40 (and the servomotor 30) when the above condition is satisfied.

The inertia value obtaining unit 105 transmits, to the position-velocity ratio adjustment unit 103, information indicating the inertia value received by the apparatus reception unit 112 from the servo driver 20. After the inertia estimation unit 209 in the servo driver 20 has determined the actual inertia value $J_p$ of the load machine 40 (and the servomotor 30), the inertia value obtained by the inertia value obtaining unit 105 (apparatus reception unit 112) from the servo driver 20 is the determined actual inertia value $J_p$ of the load machine 40 (and the servomotor 30). When the servo driver 20 is yet to determine the actual inertia value $J_p$ of the load machine 40 (and the servomotor 30), the inertia value obtained by the inertia value obtaining unit 105 from the servo driver 20 is the estimated initial inertia value $J_0$ of the load machine 40 (and the servomotor 30). In this period, the inertia value obtaining unit 105 may also obtain the initial inertia value $J_0$, and the estimated maximum value $J_{max}$ of the inertia value of the load machine 40 (and the servomotor 30) from the servo driver 20.

The inertia value obtaining unit 105 that has obtained the actual inertia value $J_p$ of the load machine 40 (and the servomotor 30) transmits information indicating the obtained actual inertia value $J_p$ to the position-velocity ratio adjustment unit 103. The inertia value obtaining unit 105 that has not obtained the actual inertia value $J_p$ of the load machine 40 (and the servomotor 30) transmits information indicating the initial inertia value $J_0$ (or the initial inertia value $J_0$, and the estimated maximum value $J_{max}$ of the inertia value of the load machine 40, and of the servomotor 30) to the position-velocity ratio adjustment unit 103.

The apparatus communication unit 110 includes the apparatus transmission unit 111 and the apparatus reception unit 112. The apparatus transmission unit 111 transmits the position proportional gain $K_{pp}$ and the velocity proportional gain $K_{vp}$ set by the gain adjustment unit 100 to the servo driver 20. The apparatus reception unit 112 receives, from the servo driver 20, the inertia value of the load machine 40 (and the servomotor 30) estimated by the inertia estimation unit 209 in the servo driver 20. The apparatus reception unit 112 may further receive, from the servo driver 20, information (identification information) used to determine whether the inertia value received from the servo driver 20 is the initial inertia value $J_0$ used when the inertia estimation unit 209 is yet to determine the actual inertia value $J_p$ of the load machine 40 (and the servomotor 30) or the actual inertia value $J_p$ of the load machine 40 (and the servomotor 30) determined by the inertia estimation unit 209.

In this example, before the inertia estimation unit 209 in the servo driver 20 determines the actual inertia value $J_p$ of the load machine 40 (and the servomotor 30), the servo driver 20 may transmit the information (identification information) indicating that the inertia estimation unit 209 has not determined the actual inertia value $J_p$ of the load machine 40 (and the servomotor 30), and the initial inertia value $J_0$ of the load machine 40 (and the servomotor 30) to the development support apparatus 10. However, the development support apparatus 10 may not obtain the initial inertia value $J_0$ of the load machine 40 (and the servomotor 30) (or the initial inertia value $J_0$, and the estimated maximum value $J_{max}$ of the inertia value of the load machine 40, and of the servomotor 30) from the servo driver 20.

For example, before the inertia estimation unit 209 determines the actual inertia value $J_p$ of the load machine 40 (and the servomotor 30), the apparatus reception unit 112 may simply receive the information (identification information) indicating that the inertia estimation unit 209 has not determined the actual inertia value $J_p$ of the load machine 40 (and the servomotor 30). The apparatus reception unit 112 may then notify the inertia value obtaining unit 105 that the apparatus reception unit 112 has simply received the identification information indicating that the inertia estimation unit 209 has not determined the actual inertia value $J_p$ of the load machine 40 (and the servomotor 30), and the inertia value obtaining unit 105 may then perform the processing described below. The inertia value obtaining unit 105 may transmit information indicating the initial inertia value $J_0$ set as appropriate (and the estimated maximum value $J_{max}$ of the inertia value of the load machine 40, and of the servomotor 30) to the position-velocity ratio adjustment unit 103.

Figure 3:
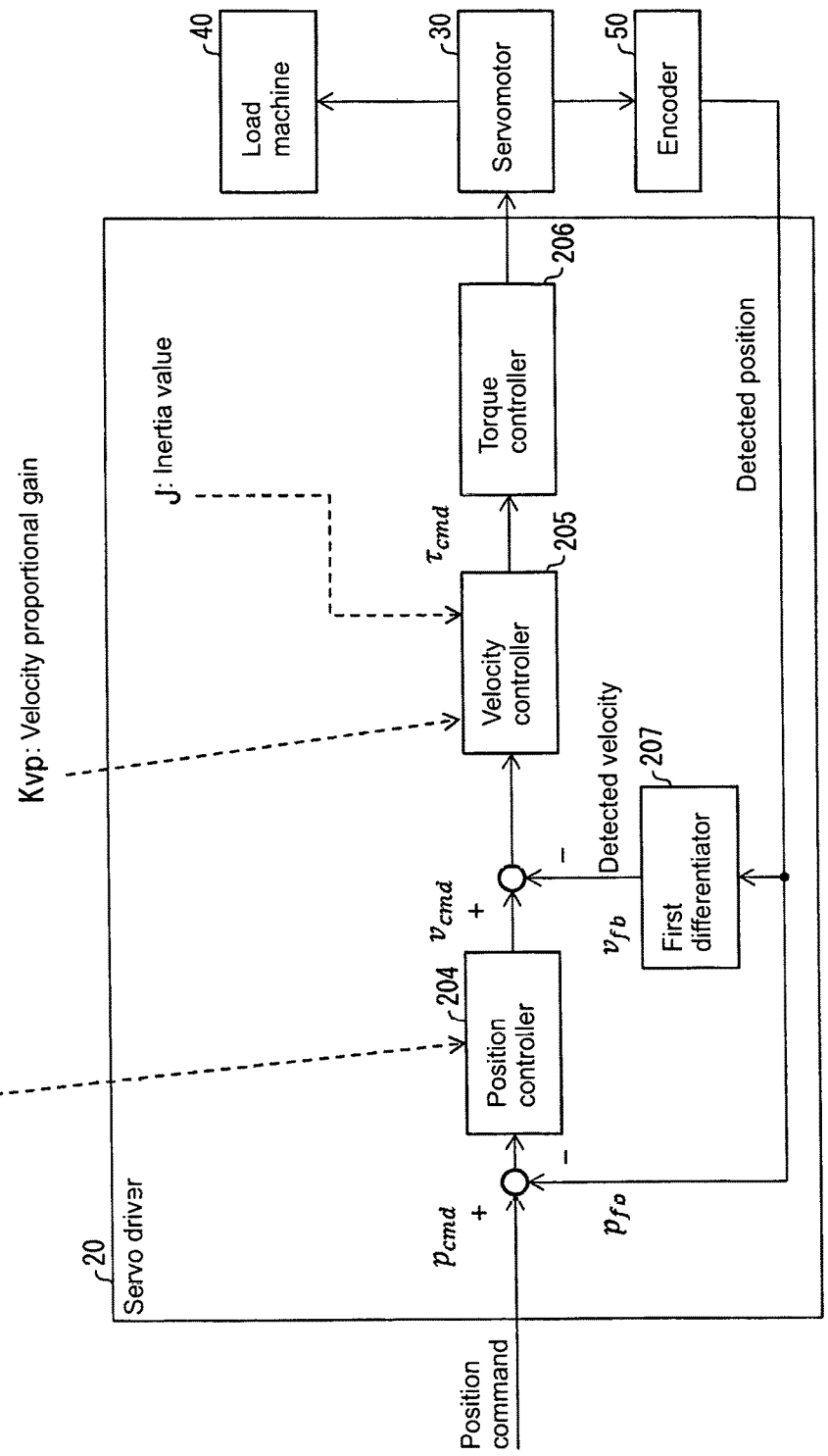
FIG. 3 is a diagram showing the correspondence between transfer elements and components of a servo driver communicating with the development support apparatus shown in FIG. 1.

Details of Servo Driver Communicating with Development Support Apparatus According to Embodiment of Present Invention FIG. 3 is a diagram showing the correspondence between the transfer elements and the components of the servo driver 20 communicating with the development support apparatus 10. FIG. 4 is a block diagram of the servo driver 20.

The servo driver 20 controls the servomotor 30 using the control parameters set and adjusted by the development support apparatus 10 (more specifically, the position gain and the velocity gain) and the control parameter internally estimated by the servo driver 20 (more specifically, the inertia value of the load machine 40, and of the servomotor 30) to drive the load machine 40. A command for the servo driver 20 for operating the motor may be provided, for example, through the setting performed by the development support apparatus 10 or based on an input from the controller 80 illustrated in FIG. 2.

The servo driver 20 includes a driver communication unit 201, a storage unit 202, the position controller 204, the velocity controller 205, a torque controller 206, a first differentiator 207, a second differentiator 208, and the inertia estimation unit 209.

The driver communication unit 201 communicates with another apparatus such as the development support apparatus 10 by wireless or wired communications to exchange predetermined data with each other. More specifically, the driver communication unit 201 transmits the inertia value of the load machine 40 (and the servomotor 30) estimated by the inertia estimation unit 209 to the development support apparatus 10. The driver communication unit 201 also receives, from the development support apparatus 10, the position gain (position proportional gain $K_{pp}$) and the velocity gain (velocity proportional gain $K_{vp}$) set by the development support apparatus 10. The driver communication unit 201 stores the position gain and the velocity gain received from the development support apparatus 10 into a control parameter table 203.

The storage unit 202 stores various pieces of data used by the servo driver 20. The storage unit 202 stores programs executed by the servo driver 20 (in particular, the position controller 204, the velocity controller 205, the torque controller 206, the first differentiator 207, the second differentiator 208, and the inertia estimation unit 209), namely, (1)

a control program, (2) an operating system (OS) program, and (3) application programs for implementing various functions, and (4) various pieces of data that are read when the application programs are executed. The data for the programs (1) to (4) is stored in, for example, a nonvolatile storage medium, such as a read only memory (ROM), a flash memory, an erasable programmable ROM (EPROM), an electrically erasable programmable ROM (EEPROM, a registered trademark), or a hard disk drive (HDD). The storage unit 202 also stores the control parameter table 203.

The control parameter table 203 stores control parameters used for controlling the servo driver 20 including the position gain (position proportional gain $K_{pp}$), the velocity gain (velocity proportional gain $K_{vp}$), and the inertia value (inertia set value $J_c$), which are used by the servo driver 20 to control the driving status of the servomotor 30.

Figure 4:
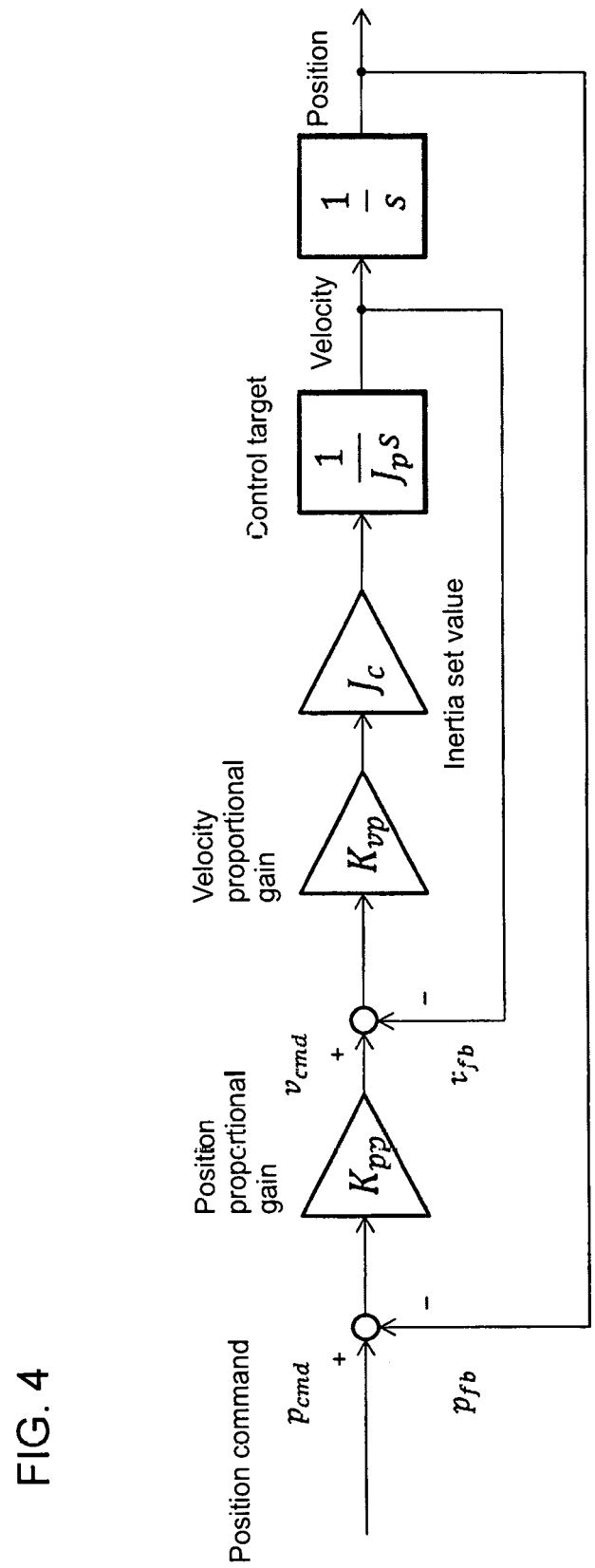
FIG. 4 is a block diagram of the servo driver communicating with the development support apparatus shown in FIG. 1.

As shown in FIGS. 3 and 4, the position controller 204 performs, for example, proportional control (P control). More specifically, the position controller 204 outputs a velocity command $v_{cmd}$ based on a positional deviation of a position command $p_{cmd}$, which is provided from an external source (e.g., from a user), from a feedback position $p_{fb}$, which is obtained from the encoder 50. The position controller 204 obtains a position proportional gain $K_{pp}$ as a control parameter by referring to the control parameter table 203. The relationship between the position command $pc_{md}$, the feedback position $p_{fb}$, the velocity command $v_{cmd}$, and the position proportional gain $K_{pp}$ can be written as: $v_{cmd}=K_{pp}*(p_{cmd}-p_{fb})$.

The velocity controller 205 performs, for example, proportional control (P control). More specifically, the velocity controller 205 outputs a torque command $\tau_{cmd}$ based on a velocity deviation of the velocity command $v_{cmd}$ from a feedback velocity $v_{fb}$ calculated by the first differentiator 207 based on the feedback position $p_{fb}$ obtained from the encoder 50. The velocity controller 205 also obtains the velocity proportional gain $K_{vp}$ and the inertia set value $J_c$ as control parameters by referring to the control parameter table 203. The relationship between the velocity command $v_{cmd}$, the feedback velocity $v_{fb}$, the torque command $\tau_{cmd}$, the velocity proportional gain $K_{vp}$, and the inertia set value $J_c$ can be written as: $\tau_{cmd}=J_c*K_{vp}*(v_{cmd}-v_{fb})$. Although the velocity controller 205 in this example performs proportional control (P control), the velocity controller 205 may not perform P control, and may perform PI control.

The torque controller 206 controls the servomotor 30 based on the torque command $\tau_{cmd}$ generated by the velocity controller 205. The first differentiator 207 calculates the feedback velocity $v_{fb}$ based on the feedback position $p_{fb}$ obtained from the encoder 50. The second differentiator 208 calculates the acceleration based on the feedback velocity $v_{fb}$ calculated by the first differentiator 207, and transmits the calculated acceleration to the inertia estimation unit 209.

The inertia estimation unit 209 estimates the inertia value of the load machine 40 (and the servomotor 30) based on the acceleration calculated by the second differentiator 208 and the torque provided to the servomotor 30 by the torque controller 206 based on the torque command $\tau_{cmd}$. The servo driver 20 uses, as appropriate, the estimation results obtained by the inertia estimation unit 209 as a control parameter (inertia set value $J_c$) used in the control performed by the servomotor 30. The estimation results obtained by the inertia estimation unit 209 are transmitted from the servo driver 20 to the development support apparatus 10 as the inertia set value $J_c$. The inertia estimation unit 209 stores the estimated inertia value of the load machine 40 (and the servomotor 30) into the control parameter table 203 as the inertia set value $J_c$.

As described above, when the inertia estimation unit 209 is yet to determine the real inertia value $J_p$ of the load machine 40 (and the servomotor 30), the inertia set value $J_c$ is equal to the initial inertia value $J_0$. When the inertia estimation unit 209 is yet to determine the real inertia value $J_p$, the servo driver 20 transmits, to the development support apparatus 10, information indicating the inertia set value $J_c$ (or the initial inertia value $J_0$) and the estimated maximum value $J_{max}$ of the inertia value of the load machine 40 (and the servomotor 30). When the inertia estimation unit 209 has determined the real inertia value $J_p$ of the load machine 40 (and the servomotor 30), the servo driver 20 transmits information indicating the inertia set value $J_c$ (or the real inertia value $J_p$) to the development support apparatus 10.

The encoder 50 detects the position of the servomotor 30, and for example, the rotational angle of the servomotor 30. The encoder 50 transmits information indicating the detected position to the servo driver 20. The encoder 50 may also detect the velocity of the servomotor 30 and may transmit information indicating the detected velocity to the servo driver 20. In this case, the servo driver 20 may not include the first differentiator 207, which calculates the velocity of the servomotor 30 based on the position of the servomotor 30 detected by the encoder 50.

Setting Initial Values of Control Parameters

For the development support apparatus 10 and the servo driver 20 with the structures described above, the relationship (ratio) to be defined between the position proportional gain $K_{pp}$ and the velocity proportional gain $K_{vp}$ adjusted by the position-velocity ratio adjustment unit 103 (gain adjustment unit 100) will now be described.

Assuming that the transfer function of the torque controller 206 is 1, and the load machine 40 and the servomotor 30, which are control targets, have the inertia value $J_p$ of single inertia, a transfer function for the position control is written by Formula 1 with a second-order lag.

$$G = \frac{\frac{J_c}{J_p} \cdot K_{pp} K_{vp}}{s^2 + \frac{J_c}{J_p} \cdot K_{vp} s + \frac{J_c}{J_p} \cdot K_{pp} K_{vp}} \quad \text{Formula 1}$$

In Formula 1, s is the Laplace operator, and $J_c$ is the inertia set value of the velocity controller 205. The damping coefficient $\zeta$ is written by Formula 2 below.

$$\zeta = \frac{1}{2}\sqrt{\frac{J_c}{J_p} \cdot \frac{K_{vp}}{K_{pp}}} \quad \text{Formula 2}$$

The relational expression of the position proportional gain $K_{pp}$ and the velocity proportional gain $K_{vp}$ is defined using a constant $\alpha$ as $K_{pp}=K_{vp}/\alpha$. When the inertia set value $J_c$ of the velocity controller 205 is equal to the inertia value $J_p$ of the control targets (the load machine 40 and the servomotor 30), the transfer function written by Formula 1 is written by Formula 3 below.

$$G = \frac{K_{vp}^2/\alpha}{s^2 + K_{vp}s + K_{vp}^2/\alpha} \quad \text{Formula 3}$$

In this state, the damping coefficient ζ is a constant value written by Formula 4 below, allowing gain adjustment with position control performed in a constantly stable manner. More specifically, the position proportional gain $K_{pp}$ and the velocity proportional gain $K_{vp}$ determined to satisfy the relationship written by $K_{pp} = K_{vp}/\alpha$ allow position control to be performed in a constantly stable manner. The constant α may be, for example, any real number equal to or greater than 4.

$$\zeta = \frac{1}{2}\sqrt{\alpha} \qquad \text{Formula 4}$$

The range of the inertia value $J_p$ of the control targets that can be driven (the load machine 40 and the servomotor 30) is defined as Formula 5 below. In the formula, $J_{max}$ is the estimated maximum value of the inertia value of the load machine 40 (and the servomotor 30), and $J_{min}$ is the estimated minimum value of the inertia value of the load machine 40 (and the servomotor 30). This range defines the specifications of the servo driver 20 and the servomotor 30.

$$J_{min} \leq J_p \leq J_{max} \qquad \text{Formula 5}$$

The initial values of the position proportional gain $K_{pp}$, the velocity proportional gain $K_{vp}$, and the inertia set value $J_c$ (the initial velocity proportional gain $K_{vp0}$ and the initial inertia set value $J_0$) are defined as Formula 6.

$$J_c = J_0 \qquad \text{Formula 6}$$
$$K_{vp} = K_{vp0}$$
$$K_{pp} = \frac{J_0}{J_{max}} \cdot \frac{K_{vp}}{\alpha}$$

When the control parameters are set as defined in Formula 6, the damping coefficient ζ written by Formula 2 is written by Formula 7 below.

$$\frac{1}{2}\sqrt{\frac{J_0}{J_{max}} \cdot \frac{K_{vp0}}{\frac{J_0}{J_{max}} \cdot \frac{K_{vp0}}{\alpha}}} \leq \zeta \leq \qquad \text{Formula 7}$$

$$\frac{1}{2}\sqrt{\frac{J_0}{J_{min}} \cdot \frac{K_{vp0}}{\frac{J_0}{J_{max}} \cdot \frac{K_{vp0}}{\alpha}}} \frac{1}{2}\sqrt{\alpha} \leq \zeta \leq \frac{1}{2}\sqrt{\alpha} \cdot \sqrt{\frac{J_{max}}{J_{min}}}$$

The damping coefficient ζ is equal to or greater than a predetermined value, independently of any deviation of the initial value of the inertia set value $J_c$ from the inertia value $J_p$ of the control targets (the load machine 40 and the servomotor 30). This stabilizes the position control. The processing performed by the development support apparatus 10 with the structure described in detail above will now be described with reference to FIG. 5.

Figure 5:
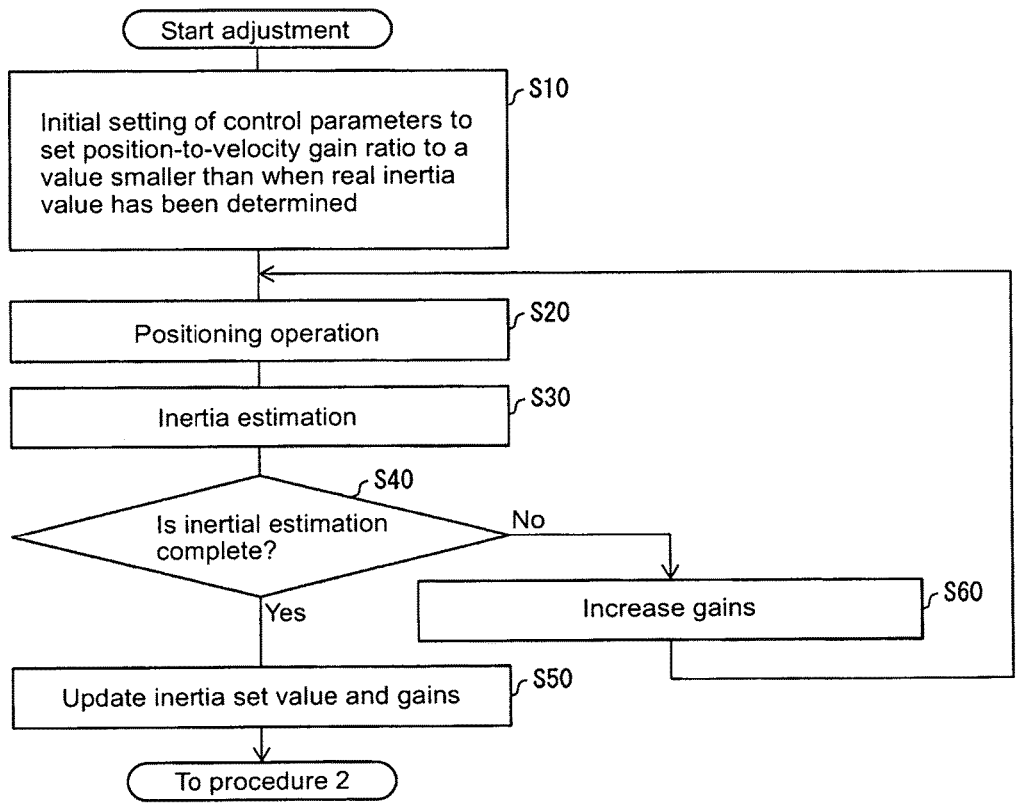
FIG. 5 is a flowchart showing the processing performed by the development support apparatus shown in FIG. 1.

Processing Performed by Development Support Apparatus According to Embodiment of Present Invention FIG. 5 is a flowchart showing the processing performed by the development support apparatus 10. More specifically, FIG. 5 is a flowchart showing an adjustment process implemented by the development support apparatus 10 to adjust the position gain (position proportional gain $K_{pp}$) and the velocity gain (velocity proportional gain $K_{vp}$) (adjustment process). The development support apparatus 10 first performs the initial setting of the control parameters (the position gain and the velocity gain) to set the ratio of the position gain to the velocity gain to a value smaller than the ratio set when the real inertia value (the inertia value $J_p$ of the load machine 40 and the servomotor 30) has been determined (S10). More specifically, the development support apparatus 10 transmits information indicating the initial values of the position gain and the velocity gain to the servo driver 20.

Subsequently, the development support apparatus 10 provides a command for the servo driver 20 to drive and position the servomotor 30 (as a trial) (S20). More specifically, the development support apparatus 10 causes the servo driver 20 to operate the servomotor 30 using the received initial values of the position gain and the velocity gain. The servomotor 30 thus drives the load machine 40. The development support apparatus 10 causes the servo driver 20 to measure the responsiveness.

In accordance with the measured responsiveness, the development support apparatus 10 causes the servo driver 20 to perform inertia estimation (S30). More specifically, the development support apparatus 10 causes the inertia estimation unit 209 included in the servo driver 20 to estimate the inertia value of the load machine 40 (and the servomotor 30) based on the positioning operation performed by the servo driver 20 using the initial values of the position gain and the velocity gain.

When the inertia estimation unit 209 has not completed the inertia estimation (No in S40), in other words, the inertia estimation unit 209 has not determined the actual inertia value $J_p$ of the load machine 40 (and the servomotor 30), the development support apparatus 10 performs the processing described below. When the actual inertia value $J_p$ of the load machine 40 (and the servomotor 30) is not correctly estimated (or cannot be determined), the gains (the position gain and the velocity gain) may be too low (small) to generate the acceleration and the torque used to estimate the inertia value. In this case, the development support apparatus 10 increases the gains (the position gain and the velocity gain) transmitted to the servo driver 20 (S60). More specifically, the development support apparatus 10 causes the servo driver 20 to set a larger position gain and a larger velocity gain. The development support apparatus 10 repeats the processing in S20 and S30. The development support apparatus 10 repeats the processing in S60, S20, and S30 until the inertia estimation unit 209 completes the inertia estimation, or in other words until the inertia estimation unit 209 determines the actual inertia value $J_p$.

When the inertia estimation unit 209 has completed the inertia estimation (Yes in S40), or in other words when the inertia estimation unit 209 has determined the actual inertia value $J_p$ of the load machine 40 (and the servomotor 30), the development support apparatus 10 causes the servo driver 20 to update the inertia set value and the gains (S50). More specifically, the servo driver 20 stores the actual inertia value $J_p$ of the load machine 40 (and the servomotor 30) determined by the inertia estimation unit 209 into the control parameter table 203. The servo driver 20 also stores the optimum gains (the position gain and the velocity gain) corresponding to the actual inertia value $J_p$ of the load machine 40 (and the servomotor 30) into the control parameter table 203.

The control parameter adjustment method implemented by the development support apparatus 10 described above can now be summarized. The control parameter adjustment method implemented by the development support apparatus 10 is used to adjust a control parameter for the servomotor 30. The method includes a gain adjustment process (S10) for adjusting the position proportional gain $K_{pp}$ and the velocity proportional gain $K_{vp}$ in parallel. The position proportional gain $K_{pp}$ is used in position control performed by the servo driver 20 that controls the servomotor 30. The velocity proportional gain $K_{vp}$ is used in velocity control performed by the servo driver 20. In the gain adjustment process, when the servo driver 20 is yet to determine the actual inertia value $J_p$ of the load machine 40 (and the servomotor 30), the ratio of the position proportional gain $K_{pp}$ to the velocity proportional gain $K_{vp}$ is set to a value smaller than the ratio set when the servo driver 20 has determined the actual inertia value $J_p$ of the load machine 40 (and the servomotor 30).

When the actual inertia value $J_p$ of the load machine 40 (and the servomotor 30) is yet to be determined, the control parameter adjustment method sets the ratio of the position proportional gain $K_{pp}$ to the velocity proportional gain $K_{vp}$ to a value smaller than the ratio set when the servo driver 20 has determined the actual inertia value $J_p$ of the load machine 40 (and the servomotor 30). In this case, the damping coefficient in a transfer function for the position control performed in the servo driver 20 is greater than a damping coefficient used when the actual inertia value $J_p$ of the load machine 40 (and the servomotor 30) has been determined. The control parameter adjustment method thus enables the servo driver 20 to perform control that is less likely to cause an overshoot when the actual inertia value $J_p$ of the load machine 40 (and the servomotor 30) is yet to be determined.

Second Embodiment

Another embodiment of the present invention will now be described with reference to FIGS. 6 and 7. For simplicity, components and processes (steps and processing details) different from those in the first embodiment will be described. More specifically, the components and processes described in the first embodiment are included in the present embodiment. The term definitions in the first embodiment are also used in the present embodiment.

Overview of Development Support Apparatus According to Second Embodiment

To facilitate understanding of a development support apparatus 60 (adjustment apparatus for adjusting a control parameter for a servomotor 30) according to the second embodiment of the present invention, the difference between the development support apparatus 60 and the development support apparatus 90 known in the art described with reference to FIGS. 9 and 10 will now be described. As described above, the development support apparatus 90 known in the art and the servo driver 21 described with reference to FIGS. 9 and 10 have Issue 2 described below.

The development support apparatus 90 known in the art does not cause the servo driver 21 to change the position gain and the velocity gain used in the servo driver 21 at the timing when the inertia set value $J_c$ used by the velocity controller 212 in the servo driver 21 is changed. More specifically, at the timing when the inertia estimation unit 215 in the servo driver 21 changes the estimated inertia value of the load machine 40 (and the servomotor 30) and the velocity controller 212 uses the changed inertia set value $J_c$, the velocity gain used by the velocity controller 212 remains as before the inertia set value $J_c$ is changed Thus, the characteristics of the velocity controller 212 in the servo driver 21 may change suddenly when the inertia estimation unit 215 in the servo driver 21 automatically updates the inertia set value $J_c$ to a larger value. This may cause unfavorable phenomena such as an oscillation of the servomotor 30 (load machine 40) and a sudden change in its operation.

The development support apparatus 60 according to the second embodiment of the present invention responds to the issue 2 faced by the development support apparatus 90 known in the art. When the servo driver 20 (inertia estimation unit 209) updates the inertia set value, the development support apparatus 60 updates the velocity gain transmitted to the servo driver 20 in accordance with the changed inertia set value without causing the characteristics of the velocity controller 205 to change greatly in response to the update of the inertia set value.

The development support apparatus 60 responding to the issue 2 faced by the development support apparatus 90 known in the art and the servo driver 21 can now be summarized. When the apparatus reception unit 112 in the development support apparatus 60 receives the real inertia value $J_p$ determined as the actual inertia value $J_p$ of the load machine 40 (and the servomotor 30) from the servo driver 20, the gain adjustment unit 100 in the development support apparatus 60 sets the velocity proportional gain $K'_{vp}$ used after the real inertia value $J_p$ is received to cause the product of the initial inertia value $J_0$ multiplied by the velocity proportional gain $K_{vp}$ set before the real inertia value $J_p$ is received to be equal to the product of the real inertia value $J_p$ multiplied by the velocity proportional gain $K'_{vp}$ set after the real inertia value $J_p$ is received.

The development support apparatus 60 with this structure sets the velocity proportional gain $K'_{vp}$ used after the real inertia value $J_p$ is received to cause the product of the initial inertia value $J_0$ multiplied by the velocity proportional gain $K_{vp}$ set before the real inertia value $J_p$ is received to be equal to the product of the real inertia value $J_p$ multiplied by the velocity proportional gain $K'_{vp}$ set after the real inertia value $J_p$ is received. Thus, the development support apparatus 60 can adjust the velocity control characteristics of the servo driver 20 gradually without changing them greatly, independently of any large deviation of the initial inertia value $J_0$ from the real inertia value $J_p$. The development support apparatus 60 thus prevents an oscillation and a sudden operational change during control.

The gain adjustment unit 100 in the development support apparatus 60 sets the position proportional gain $K'_{pp}$ used after the real inertia value $J_p$ is received based on the velocity proportional gain $K'_{vp}$ set after the real inertia value $J_p$ is received.

The development support apparatus 60 with this structure sets the position proportional gain $K'_{pp}$ used after the real inertia value $J_p$ is received based on the velocity proportional gain $K'_{vp}$ set after the real inertia value $J_p$ is received. The position proportional gain $K'_{pp}$ used after the real inertia value $J_p$ is received is set based on the velocity proportional gain $K'_{vp}$ set after the real inertia value $J_p$ is received independently of any large deviation of the initial inertia value $J_0$ from the real inertia value $J_p$. The development support apparatus 60 can use the velocity proportional gain $K'_{vp}$ used after the real inertia value $J_p$ is received to determine the position proportional gain $K'_{pp}$ to fall within a range in which the position control characteristics are stable. More specifically, the development support apparatus 60 determines the position proportional gain $K'_{pp}$ to be equal to $K'_{vp}/\alpha$ based on Formula 8 (described later). The development support apparatus 60 thus sets the optimum position proportional gain $K'_{pp}$ for performing control that is less likely to cause an overshoot. The development support apparatus 60 described briefly above will now be described in detail with reference to FIG. 6.

Figure 6:
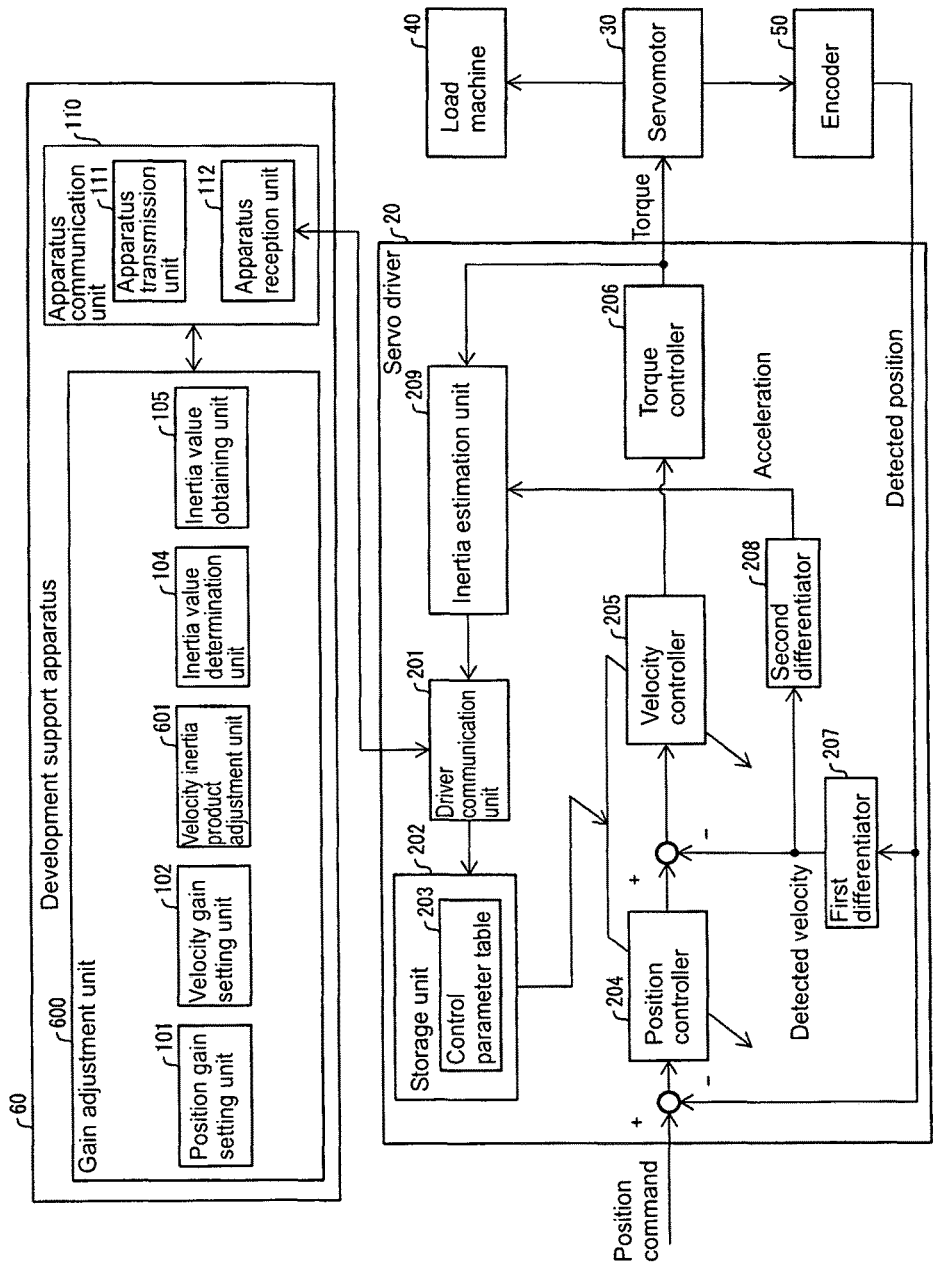
FIG. 6 is a block diagram showing the main components of a development support apparatus according to a second embodiment of the present invention.

FIG. 6 is a block diagram showing the main components of the development support apparatus 60. The development support apparatus 60 differs from the development support apparatus 10 illustrated in FIG. 1 in its velocity inertia product adjustment unit 601, which replaces the position-velocity ratio adjustment unit 103 in the development support apparatus 10. The development support apparatus 60 is the same as the development support apparatus 10 except the velocity inertia product adjustment unit 601 replacing the position-velocity ratio adjustment unit 103. Thus, the velocity inertia product adjustment unit 601 will be described mainly, and the other components will not be described in detail.

More specifically, the development support apparatus 60 includes a gain adjustment unit 600, which includes the velocity inertia product adjustment unit 601 replacing the position-velocity ratio adjustment unit 103 included in the gain adjustment unit 100. When the inertia value obtaining unit 105 (apparatus reception unit 112) obtains the actual inertia value (real inertia value $J_p$) of the load machine 40 (and the servomotor 30), the velocity inertia product adjustment unit 601 adjusts the velocity proportional gain $K'_{vp}$ to be set by (transmitted to) the servo driver 20 in the manner described below.

More specifically, the velocity inertia product adjustment unit 601 sets the velocity proportional gain used after the real inertia value $J_p$ is received (current velocity proportional gain $K'_{vp}$) to cause the product of the initial inertia value $J_0$ (initial inertia value $J_0$ before the real inertia value $J_p$ is determined), multiplied by the velocity proportional gain $K_{vp}$ transmitted to the servo driver 20 by the development support apparatus 60 before the inertia value obtaining unit 105 obtains the real inertia value $J_p$ (previous velocity proportional gain $K_{vp}$) to be equal to the product of the real inertia value $J_p$ multiplied by the new velocity proportional gain transmitted to the servo driver 20 after the real inertia value $J_p$ is received (current velocity proportional gain $K'_{vp}$).

After the inertia value obtaining unit 105 obtains the real inertia value $J_p$, the velocity inertia product adjustment unit 601 also transmits, to the servo driver 20 (for setting), information indicating the current velocity proportional gain $K'_{vp}$ together with the position proportional gain (current position proportional gain $K'_{pp}$) adjusted (controlled) in the manner described below. More specifically, the velocity inertia product adjustment unit 601 transmits information indicating the current position proportional gain $K'_{pp}$ calculated in the manner described below to the servo driver 20, which can then use the gain as a control parameter.

More specifically, the velocity inertia product adjustment unit 601 sets the position proportional gain used after the real inertia value $J_p$ is received (current position proportional gain $K'_{pp}$) to allow the ratio of the position proportional gain $K_{pp}$ to the velocity proportional gain $K_{vp}$ before the real inertia value $J_p$ is received to be equal to the ratio used after the real inertia value $J_p$ is received. The position proportional gain (position gain) transmitted to the servo driver 20 by the development support apparatus 60 before the real inertia value $J_p$ is received is referred to as the previous position proportional gain $K_{pp}$. In this case, the velocity inertia product adjustment unit 601 sets the current position proportional gain $K'_{pp}$ in the manner described below. The velocity inertia product adjustment unit 601 sets the current position proportional gain $K'_{pp}$ to allow the ratio of the previous position proportional gain $K_{pp}$ to the previous velocity proportional gain $K_{vp}$ to be equal to the ratio of the current position proportional gain $K'_{pp}$ to the current velocity proportional gain $K'_{vp}$.

Positioning Operation and Inertia Estimation

The development support apparatus 60 transmits the gains (the position proportional gain $K_{pp}$ and the velocity proportional gain $K_{vp}$) set (adjusted) by the gain adjustment unit 600 (velocity inertia product adjustment unit 601). The development support apparatus 60 provides a command for the servo driver 20 to drive and position the servomotor 30 using the gains transmitted to the servo driver 20. The inertia estimation unit 209 in the servo driver 20 measures the responsiveness of the positioning operation, and estimates the inertia value of the control targets (the load machine 40 and the servomotor 30) based on the measurement results. When the inertia estimation unit 209 cannot correctly estimate the inertia value, the gains may be too low to generate the acceleration and the torque used to estimate the inertia value. Thus, the development support apparatus 60 increases the gains (transmits information indicating larger gains) to the servo driver 20, which then performs the positioning operation. The estimation result $J_e$ of the inertia value obtained by the inertia estimation unit 209 through the positioning operation is then transmitted from the servo driver 20 to the development support apparatus 60.

When the inertia estimation result $J_e$ is received from the inertia estimation unit 209, the gain adjustment unit 600 (velocity inertia product adjustment unit 601) updates the control parameters transmitted to (to be set by) the servo driver 20 as written by Formula 8 using the current velocity proportional gain $K'_{vp}$.

$$J_c = J_e$$

$$K_{vp} = \frac{J_0}{J_e} \cdot K'_{vp}$$

$$K_{pp} = \frac{K_{vp}}{\alpha} = \frac{1}{\alpha} \cdot \frac{J_0}{J_e} \cdot K'_{vp}$$

Formula 8

As written by Formula 8, the updated velocity proportional gain $K_{vp}$ is set to cause the product of the initial inertia value $J_0$ multiplied by the velocity proportional gain $K'_{vp}$ when the inertia estimation result is received to be equal to the product of the inertia estimation result $J_e$ multiplied by the updated velocity proportional gain $K_{vp}$. Additionally, the updated position proportional gain $K_{pp}$ is updated based on the updated velocity proportional gain $K_{vp}$ as written by Formula 8. More specifically, the position proportional gain $K_{pp}$ is determined to satisfy the relationship written by $K_{pp} = K_{vp}/\alpha$, where $K_{pp}$ is the updated position proportional gain and $K_{vp}$ is the updated velocity proportional gain.

The control parameters to be transmitted to the servo driver 20 by the development support apparatus 60 are updated as written by Formula 8. This allows the characteristics of the velocity controller 205 to remain the same as written by Formula 9 below before and after the update.

$$G_{before} = J_0 \cdot K'_{vp}$$

$$G_{after} = J_e \cdot K_{vp} = J_e \cdot \frac{J_0}{J_e} \cdot K'_{vp} = J_0 \cdot K'_{vp}$$

Formula 9

Positioning Operation and Measurement of Responsiveness

The development support apparatus 60 provides a command for the servo driver 20 to drive and position the servomotor 30 (as a trial), and to measure the responsiveness. The development support apparatus 60 improves the responsivity of the servo driver 20 by gradually increasing the velocity gain (velocity proportional gain $K_{vp}$) and the position gain (position proportional gain $K_{pp}$) transmitted to the servo driver 20. When determining that the responsiveness of the servo driver 20 is optimum, the development support apparatus 60 ends the adjustment of the control parameters (the position gain and the velocity gain).

Figure 7:
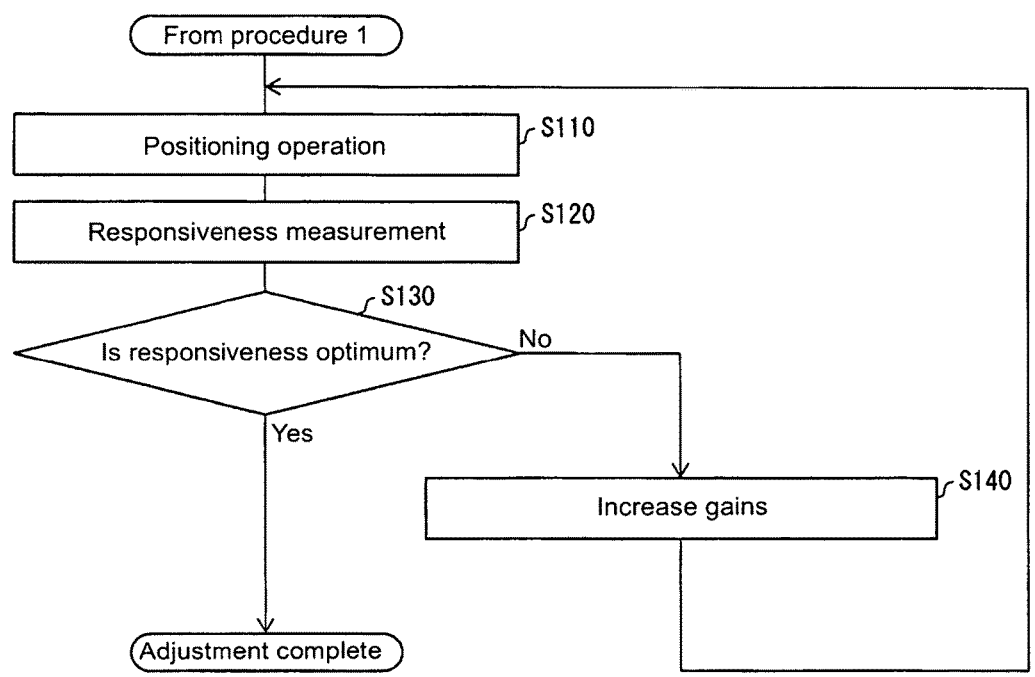
FIG. 7 is a flowchart showing the processing performed by the development support apparatus shown in FIG. 6.

FIG. 7 is a flowchart showing the processing performed by the development support apparatus 60. More specifically, FIG. 7 is a flowchart showing an adjustment process implemented by the development support apparatus 60 to adjust the position gain and the velocity gain after the inertia value estimation result $J_e$ is received from the inertia estimation unit 209 (adjustment process).

As shown in FIG. 7, the development support apparatus 60 first provides a command for the servo driver 20 to drive and position the servomotor 30 (as a trial) (S110). More specifically, the development support apparatus 60 causes the servo driver 20 to operate the servomotor 30. The servomotor 30 thus drives the load machine 40 using the received position gain and the received velocity gain. The development support apparatus 60 causes the servo driver 20 to measure the responsiveness (S120). More specifically, the development support apparatus 60 obtains the results of the positioning process performed by the servo driver 20 using the received position gain and the received velocity gain from, for example, the encoder 50. The development support apparatus 60 determines whether the responsiveness is optimum based on the measured responsiveness (e.g., the positioning results obtained from the encoder 50) (S130).

When determining that the responsiveness is not optimum (No in S130), the development support apparatus 60 increases the gains (the position gain and the velocity gain) (S140). More specifically, the development support apparatus 60 transmits, to the servo driver 21, information indicating the position gain and the velocity gain set higher than those corresponding to the responsiveness that has been determined not to be optimum. The processing from S110 to S130 is repeated. More specifically, the development support apparatus 60 improves the responsivity of the servo driver 21 by gradually increasing the position gain and the velocity gain.

When determining that the responsiveness is optimum (Yes in S130), the development support apparatus 60 ends the adjustment of the velocity gain and the position gain transmitted to the servo driver 20, or in other words determines the optimum gains (the position gain and the velocity gain), and causes the servo driver 20 to use the optimum gains.

The development support apparatus 60 improves the responsivity by gradually increasing the position gain (position proportional gain $K_{pp}$) and the velocity gain (velocity proportional gain $K_{vp}$) to allow the ratio of the position gain to the velocity gain to be constant, and ends the adjustment when the responsiveness is optimum.

Third Embodiment

Another embodiment of the present invention will now be described with reference to FIG. 8. For simplicity, components and processes (steps and processing details) different from those in the first and second embodiments will be described. More specifically, the components and processes described in the first and second embodiments are included in the present embodiment. The term definitions in the first and second embodiments are also used in the present embodiment.

To facilitate understanding of a development support apparatus 70 (adjustment apparatus for adjusting a control parameter for a servomotor 30) according to the third embodiment of the present invention, the difference from the development support apparatus 90 known in the art described with reference to FIGS. 9 and 10 will now be described.

Figure 8:
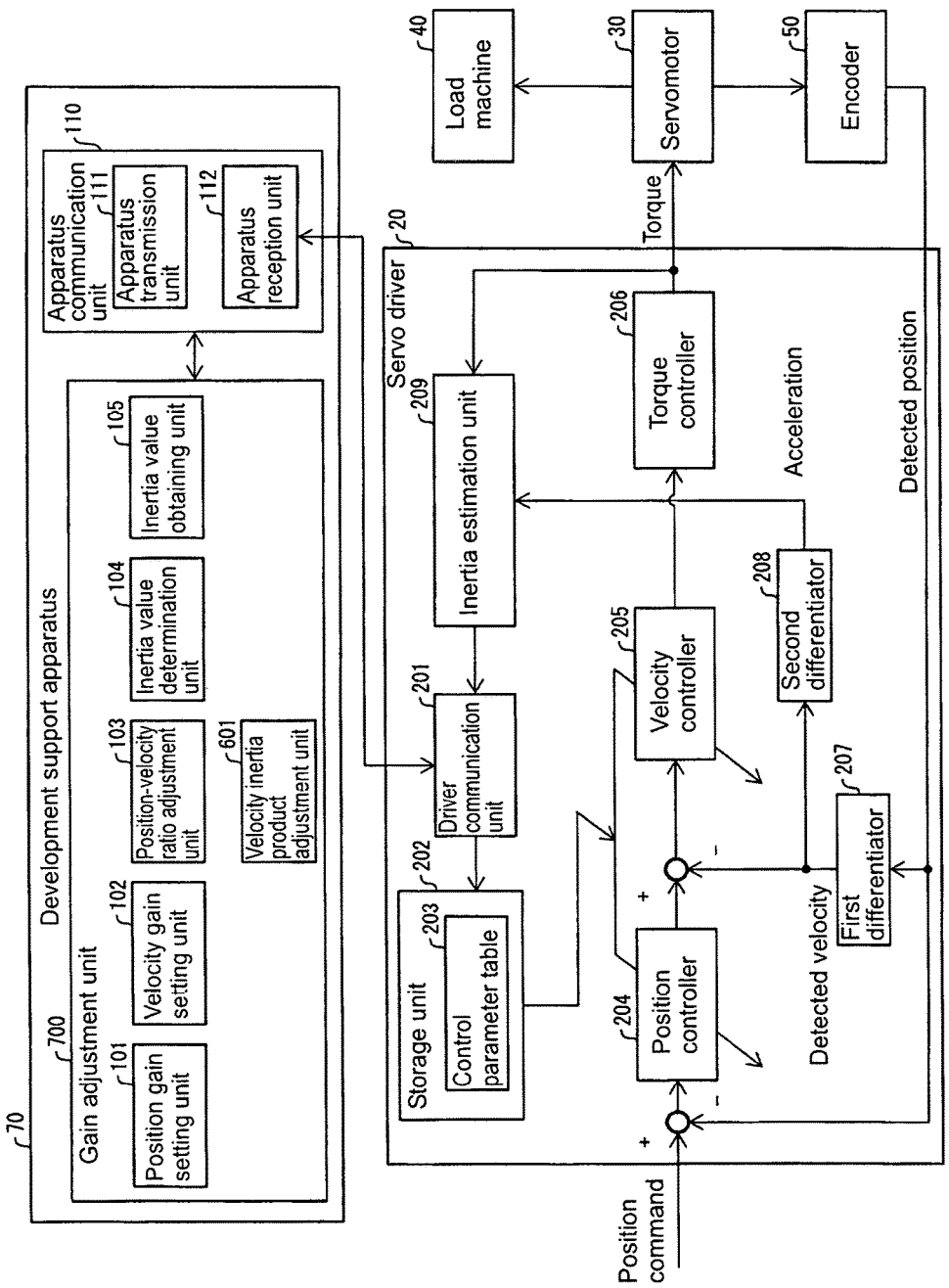
FIG. 8 is a block diagram showing the main components of a development support apparatus according to a third embodiment of the present invention.

FIG. 8 is a block diagram showing the main components of the development support apparatus 70 according to the third embodiment of the present invention. The development support apparatus 70 differs from the development support apparatus 60 illustrated in FIG. 6 in its position-velocity ratio adjustment unit 103 included in the development support apparatus 10, which is not included in the development support apparatus 60. More specifically, the development support apparatus 70 includes the components of the development support apparatus 10 and the components of the development support apparatus 60. The development support apparatus 70 includes a gain adjustment unit 700, which includes the position gain setting unit 101, the velocity gain setting unit 102, the position-velocity ratio adjustment unit 103, the inertia value determination unit 104, the inertia value obtaining unit 105, and the velocity inertia product adjustment unit 601.

Thus, the development support apparatus 70 can implement the processing performed by the development support apparatus 10 and the processing performed by the development support apparatus 60 in a continuous manner. More specifically, the development support apparatus 70 adjusts control parameters for the servomotor 30, and includes the gain adjustment unit 700, which adjusts, in parallel, the position proportional gain $K_{pp}$ used in position control performed by the servo driver 20 that controls the servomotor 30, and the velocity proportional gain $K_{vp}$ used in velocity control performed by the servo driver 20.

When the servo driver 20 is yet to determine the actual inertia value $J_p$ of the load machine 40 (and the servomotor 30), the gain adjustment unit 700 sets the ratio of the position proportional gain $K_{pp}$ to the velocity proportional gain $K_{vp}$ to a value smaller than the ratio set when the servo driver 20 has determined the actual inertia value $J_p$ of the load machine 40 (and the servomotor 30).

When the apparatus reception unit 112 in the development support apparatus 70 receives the real inertia value $J_p$ determined as the actual inertia value $J_p$ of the load machine 40 (and the servomotor 30) from the servo driver 20, the gain adjustment unit 700 in the development support apparatus 70 sets the velocity proportional gain $K'_{vp}$ used after the real inertia value $J_p$ is received to cause the product of the initial inertia value $J_0$ multiplied by the velocity proportional gain $K_{vp}$ before the real inertia value $J_p$ is received to be equal to the product of the real inertia value $J_p$ multiplied by the velocity proportional gain $K'_{vp}$ used after the real inertia value $J_p$ is received.

Additionally, the gain adjustment unit 700 in the development support apparatus 70 sets the position proportional gain $K'_{pp}$ used after the real inertia value $J_p$ is received based on the velocity proportional gain $K'_{vp}$ after the real inertia value $J_p$ is received.

Implementation Using Software

The control blocks (in particular, the position gain setting unit 101, the velocity gain setting unit 102, the position-velocity ratio adjustment unit 103, the inertia value determination unit 104, the inertia value obtaining unit 105, and the velocity inertia product adjustment unit 601) in the development support apparatus 10, the development support apparatus 60, and the development support apparatus 70 may be implemented by a logic circuit (hardware), such as an integrated circuit (IC) chip or by using software implemented by a central processing unit (CPU).

When the control blocks are implemented by using software, the development support apparatus 10, the development support apparatus 60, and the development support apparatus 70 include a CPU, which executes instructions included in a program or software to achieve its functions, a read-only memory (ROM) or a storage device (hereafter referred to as a storage medium) which stores the programs and various pieces of data readable by a computer (or by the CPU), and a random access memory (RAM), into which the program is expanded. The computer (or CPU) reads the program from the storage medium, and executes the program to achieve one or more aspects of the present invention. The storage medium may be a non-transitory tangible medium, such as a tape, a disk, a card, a semiconductor memory, or a programmable logic circuit. The program may be provided via any transmission medium that can transmit the program to the computer (such as a communication network or a broadcast wave). One or more embodiments of the present invention may be implemented using programs that are electronically transmitted in the form of data signals carried by carrier waves.

The embodiments disclosed herein should not be construed to be restrictive, but may be modified within the spirit and scope of the claimed invention. The technical features disclosed in different embodiments may be combined in other embodiments within the technical scope of the invention.

REFERENCE SIGNS LIST 10 development support apparatus
20 servo driver
60 development support apparatus
70 development support apparatus
30 servomotor
40 load machine
100 gain adjustment unit
600 gain adjustment unit
700 gain adjustment unit
$J_{max}$ estimated maximum value of inertia value of load machine
$J_0$ initial inertia value
$J_p$ real inertia value (actual inertia value of load machine)
$K_{pp}$ position proportional gain
$K_{vp}$ velocity proportional gain

The invention claimed is:

1. An adjustment apparatus for adjusting a control parameter for a servomotor, the apparatus comprising:
a memory storing a program; and
a processor coupled to the memory, the processor configured with the program to perform operations as:
a gain adjustment unit configured to adjust a position proportional gain and a velocity proportional gain, the position proportional gain being used in position control performed in a servo driver for controlling the servomotor, the velocity proportional gain being used in velocity control performed in the servo driver; and
an inertia reception unit configured to receive, from the servo driver, an inertia value of a load machine controlled by the servo driver,
wherein:
when the servo driver has not determined an actual inertia value of the load machine, the gain adjustment unit sets a ratio of the position proportional gain to the velocity proportional gain to a first value based on an estimated maximum value of the inertia value of the load machine,
when the servo driver has determined the actual inertia value of the load machine, the gain adjustment unit sets the ratio of the position proportional gain to a second value,
the first value is smaller than the second value, and
when the inertia reception unit receives, from the servo driver, an initial inertia value used when the actual inertia value of the load machine has not been determined, the gain adjustment unit sets the ratio of the position proportional gain to the velocity proportional gain to a value obtained by multiplying the second value by the initial inertia value divided by the estimated maximum value of the inertia value of the load machine.

2. The adjustment apparatus according to claim 1, wherein
the gain adjustment unit gradually increases the position proportional gain and the velocity proportional gain from initial values.

3. The adjustment apparatus according to claim 1, wherein
when the inertia reception unit receives, from the servo driver, the actual inertia value of the load machine, the gain adjustment unit sets a velocity proportional gain used after a real inertia value is received such that the initial inertia value multiplied by a velocity proportional gain set before the real inertia value is received equals the actual inertia value of the load machine multiplied by the velocity proportional gain used after the real inertia value is received.

4. The adjustment apparatus according to claim 3, wherein
the gain adjustment unit sets the position proportional gain used after the actual inertia value of the load machine is received based on the velocity proportional gain used after the real inertia value is received.

5. A method for adjusting a control parameter for a servomotor, the method comprising:
adjusting a position proportional gain and a velocity proportional gain, the position proportional gain being used in position control performed in a servo driver for controlling the servomotor, the velocity proportional gain being used in velocity control performed in the servo driver; and
receiving an inertia value of a load machine, wherein:
when the servo driver has not determined an actual inertia value of the load machine, a ratio of the position proportional gain to the velocity proportional gain is set to a first value in accordance with an estimated maximum inertia value of the load machine,
when the servo driver has determined the actual inertia value of the load machine, the ratio of the position proportional gain to the velocity proportional gain is set to a second value,
the first value is smaller than the second value, and
when the servo driver has not determined the actual inertia value of the load machine, the inertia value received from the load machine comprises an initial inertia value and the first value is obtained by multiplying the second value with the initial inertia value divided by the estimated maximum inertia value of the load machine.

6. A non-transitory computer-readable storage medium storing instructions, which, when executed by a processor, cause the processor to perform operations comprising:

adjusting a position proportional gain and a velocity proportional gain, the position proportional gain being used in position control performed in a servo driver for controlling a servomotor, the velocity proportional gain being used in velocity control performed in the servo driver; and receiving an inertia value of a load machine, wherein:

when the servo driver has not determined an actual inertia value of the load machine, a ratio of the position proportional gain to the velocity proportional gain is set to a first value in accordance with an estimated maximum inertia value of the load machine, when the servo driver has determined the actual inertia value of the load machine, the ratio of the position proportional gain to the velocity proportional gain is set to a second value, the first value is smaller than the second value, and when the servo driver has not determined the actual inertia value of the load machine, the inertia value received from the load machine comprises an initial inertia value and the first value is obtained by multiplying the second value with the initial inertia value divided by the estimated maximum inertia value of the load machine.

\* \* \* \* \*